US006733392B2

(12) United States Patent
Narita

(10) Patent No.: US 6,733,392 B2
(45) Date of Patent: May 11, 2004

(54) MOBILE TERMINAL, METHOD FOR CONTROLLING GAMES, AND COMPUTER READABLE RECORDING MEDIUM

(75) Inventor: Ken Narita, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 10/445,008

(22) Filed: May 27, 2003

(65) Prior Publication Data

US 2003/0195044 A1 Oct. 16, 2003

Related U.S. Application Data

(62) Division of application No. 09/537,106, filed on Mar. 29, 2000.

(30) Foreign Application Priority Data

Sep. 30, 1999 (JP) ............................................ 11-278899
Dec. 28, 1999 (JP) ............................................ 11-375189

(51) Int. Cl.[7] ................................................ A63F 13/00
(52) U.S. Cl. ............................ 463/43; 463/29; 463/41; 463/8
(58) Field of Search ............................ 463/40–43, 1–5, 463/29

(56) References Cited

U.S. PATENT DOCUMENTS 6,263,279 B1    7/2001    Bianco et al.

FOREIGN PATENT DOCUMENTS

| JP | 11333141 | 12/1991 |
|---|---|---|
| JP | 9114370 | 5/1997 |
| JP | 10151274 | 6/1998 |
| JP | 10271562 | 10/1998 |
| JP | 10322775 | 12/1998 |
| JP | 11027744 | 1/1999 |
| JP | 1188948 | 3/1999 |
| JP | 11114224 | 4/1999 |
| JP | 11155176 | 6/1999 |
| JP | 11281389 | 10/1999 |
| JP | 200196069 | 4/2001 |
| WO | 97/23853 | 7/1997 |
| WO | 93/23125 | 11/1997 |

OTHER PUBLICATIONS

English Language Translation of JP Appln. No. 10–322775.
English Language Abstract of JP Appln. No. 2001–96069.
English Language Translation of JP Appln. No. 11–155176.
English Language Translation of JP Appln. No. 11–027744.
English Language Translation of JP Appln. No. 11–333141.
English Language Translation of JP Appln. No. 9–114370.
English Language Translation of JP Appln. No. 11–281389.

*Primary Examiner*—John M. Hotaling, II
(74) *Attorney, Agent, or Firm*—Greenblum & Bernstein, P.L.C.

(57) ABSTRACT

Progression of a game executed at a mobile terminal is changed in response to the radiowave reception intensity of radio signals received by the mobile terminal. During the course of the progression of a game, enemy characters to combat, items to be generated, and the branching of the game scenario are controlled in accordance with the received signal intensity.

15 Claims, 22 Drawing Sheets

FIG. 4

| ID CODE CLASS | ENEMY CHARACTER |
|---|---|
| 00 | ENEMY CHARACTER EC1 |
|  | ENEMY CHARACTER EC2 |
| 01 | ENEMY CHARACTER EC3 |
|  | ENEMY CHARACTER EC4 |
| 02 | ENEMY CHARACTER EC5 |
|  | ENEMY CHARACTER EC6 |
|  | ENEMY CHARACTER EC7 |
|  | ENEMY CHARACTER EC8 |
| ⋮ | ⋮ |
| FF | ENEMY CHARACTER EC253 |
|  | ENEMY CHARACTER EC254 |
|  | ENEMY CHARACTER EC255 |
|  | ENEMY CHARACTER EC256 |

FIG. 5

| ID CODE CLASS | ITEM |
|---|---|
| 00 | ITEM R1 |
| 01 | ITEM R2 |
|  | ITEM R3 |
| 02, 03 | ITEM R3 |
|  | ITEM R4 |
| ⋮ | ⋮ |
| FF | ITEM R251 |
|  | ITEM R254 |
|  | ITEM R255 |
|  | ITEM R256 |

| BRANCH POINT NO. | ID CODE CLASS | BRANCH SCENARIO |
|---|---|---|
| BRANCH POINT 1 | 00 ~ 7F | SCENARIO a1 |
|  | 80 ~ FF | SCENARIO a2 |
| BRANCH POINT 2 | 00 ~ 3F | SCENARIO b1 |
|  | 40 ~ 7F | SCENARIO b2 |
|  | 80 ~ FF | SCENARIO b3 |
| BRANCH POINT 3 | 00 ~ 7F | SCENARIO c1 |
|  | 80 ~ FF | SCENARIO c2 |
| ⋮ | ⋮ | ⋮ |

FIG. 10A

| BASE STATION | A |
|---|---|
| ID CODE CLASS | 0 0 |
| ENEMY CHARACTER APPEARS | Battle! (91) Name: △△△△ LV: 3 HP: 32    Battle! (92) Name: ○○○○ LV: 4 HP: 36    Battle! (93) Name: ×××× LV: 4 HP: 38 |

FIG. 10B

| BASE STATION | B |
|---|---|
| ID CODE CLASS | 0 1 |
| ENEMY CHARACTER APPEARS | Battle! (93) Name: ×××× LV: 4 HP: 38    Battle! (94) Name: □□□□ LV: 5 HP: 46 |

FIG. 14

| RADIOWAVE RECEPTION INTENSITY (121a) | ENEMY CHARACTER (121b) |
|---|---|
| GOOD | FOLLOW CHARACTER CONTROL TABLE 81 (FIG. 4) |
| LEVEL 1 | ENEMY CHARACTER EC1 |
| | ENEMY CHARACTER EC2 |
| LEVEL 2 | ENEMY CHARACTER EC1 |
| LEVEL 3 | ENEMY CHARACTER EC256 |

FIG. 15

| RADIOWAVE RECEPTION INTENSITY (122a) | ITEM (122b) |
|---|---|
| GOOD | FOLLOW ITEM CONTROL TABLE 82 (FIG. 5) |
| LEVEL 1 | ITEM R2 |
| LEVEL 1 | ITEM R3 |
| LEVEL 2 | ITEM R1 |
| LEVEL 3 | NO ITEM GENERATED |

FIG. 16

| BRANCH POINT NO. | RADIOWAVE RECEPTION INTENSITY | BRANCH SCENARIO |
|---|---|---|
| BRANCH POINT 1 | GOOD | FOLLOW SCENARIO CONTROL TABLE 83 (FIG. 6) |
| | LEVEL 1 | SCENARIO a1 |
| | | SCENARIO a2 |
| | LEVEL 2 | SCENARIO a1 |
| | LEVEL 3 | SCENARIO a3 |
| ⋮ | ⋮ | ⋮ |

# MOBILE TERMINAL, METHOD FOR CONTROLLING GAMES, AND COMPUTER READABLE RECORDING MEDIUM

CROSS-REFERENCE TO RELATED APPLICATION

This application is a division of U.S. patent application Ser. No. 09/537,106, filed on Mar. 29, 2000, the content of which is incorporated by reference herein in its entirety.

BACKGROUND OF THE INVENTION

1. Field of the Invention

The present invention relates to video games, and more particularly to a mobile terminal, a method for controlling games, and a computer readable recording medium.

2. Description of the Related Art

Recently, portable game machines have sprung into widespread use, with which one can enjoy playing video games without being limited by place or time. Some recent portable electronic devices such as portable telephone sets, PHS (Personal Handy-phone System), electronic notebooks, and notebook personal computers have a game function in addition to the functions that the electronic devices originally have. Portable game machines and these electronic devices are small and transportable, so that the user can use these devices at various places.

There is a technique, disclosed in Japanese Laid-Open Patent Publication No. 322775, published in 1998, which addresses the fact that the device can be used at various places and allows the positional information of the device to be acquired and used to control the device. This publication describes a control technique of an electronic device that receives base station identification signals transmitted from controlling base stations in response to incoming and outgoing calls to count the signals and displays character images of imaginary living bodies or creatures, which are different depending on the base station identification signal, when the result of the counting has reached a predetermined value. By this method, character images of the imaginary living bodies or creatures, which are different from one another depending on the area that the base stations control, can be displayed.

However, the method described in the aforementioned publication, only displays character images on a display screen, which are different from one another, depending on the area the base stations control, in accordance with the acquired positional information of the device. This method is not especially enjoyable as a game.

The present invention was developed in view of the aforementioned problems. Its object is to provide a mobile terminal, a method for controlling a game, and a computer readable recording medium, which can vary the progression of the game to be executed on the mobile terminal, in accordance with the current location of the mobile terminal.

SUMMARY OF THE INVENTION

According to a first aspect of the present invention, a mobile terminal includes an input system that inputs data in response to a location of the mobile terminal, and a determining system that determines the location of the mobile terminal in accordance with the data input by the input system. The mobile terminal also includes a progress system that allows a game to proceed in response to the location determined by the determination system in a progression of the game to be executed in response to operation input; and a display that displays images in response to the progression of the game by the progress system.

In the first aspect of the present invention, the mobile terminal is characterized in that the data is base station identification information provided uniquely for each of a number of base stations, with which the mobile terminal carries out communications, and for identifying each base station.

In the first aspect of the present invention, the mobile terminal also includes a branch information storage that stores a correspondence relationship between a location and scenario branch information for branching a scenario progression of a game. The progress system branches the progression of the game in response to the scenario branch information stored in the branch information storage corresponding to the location determined by the determination system.

In the first aspect of the present invention, the mobile terminal also includes a character storage that stores a correspondence relationship between a location and one or more game characters. The progress system determines a game character to be displayed, from the one or more game characters stored in the character storage corresponding to the location that is determined by the determination system, to vary the progression of the game.

In the first aspect of the present invention, in which an item has an attribute for giving a variation to a game progression, the mobile terminal also includes an item storage that stores a correspondence relationship between a position and one or more items. The progress system determines an item to be displayed, from the one or more items stored in the item storage corresponding to the location determined by the determination system, to vary the progression of the game.

In the first aspect of the present invention, the mobile terminal also includes a data acquisition system that acquires programs and data of a game from another apparatus which can communicate with multiple base stations or each of the base stations. The progression system allows the game to proceed in accordance with programs and data of the game, which the data acquisition system has acquired.

According to a second aspect of the present invention, a mobile terminal which can receive radio signals transmitted by each of the base stations includes a detector that detects radiowave reception intensity of radio signals transmitted by the base stations. The mobile terminal also includes a progress system that allows a game to proceed according to the radiowave reception intensity detected by the detector in the course of the progression of the game which is carried out in response to operation input; and a display that displays images in response to the progression of the game.

According to a third aspect of the present invention, a method for controlling a game in a mobile terminal includes inputting data in response to a location of the mobile terminal; determining the location of the mobile terminal in accordance with the data input; allowing the game to proceed in response to the determined location in the course of the progression of the game to be carried out in response to operation input; and displaying images in response to the progression of the game.

In the third aspect of the present invention, the method for controlling the game is characterized in that the data is base station identification information provided uniquely for each of the base stations, with which the mobile terminal carries out communications, and for identifying each base station.

According to a fourth aspect of the present invention, a method for controlling a game at a mobile terminal which can receive radio signals transmitted by each of a number of base stations includes detecting a radiowave reception intensity of radio signals transmitted by base stations; allowing the game to proceed according to the radiowave reception intensity detected in the course of the progression of the game which is carried out in response to operation input; and displaying images in response to the progression of the game.

According to a fifth aspect of the present invention, a computer readable recording medium in which programs of a game to be executed on a mobile terminal are stored is characterized by storing programs for allowing a computer to: input data corresponding to a location of the mobile terminal; determine the location of the mobile terminal in accordance with the input data; carry out the game in response to the determined location in the progression of the game to be executed and in response to operation input; and display images according to the progression of the game.

In the fifth aspect of the present invention, the computer program stored in the computer readable recording medium is characterized in that the data is base station identification information provided uniquely for each of the base stations and for identifying each base station.

In the fifth aspect of the present invention, the computer program stored on the computer readable recording medium is also characterized in that, in a case where a game is allowed to proceed, progression of a scenario of the game is branched in accordance with scenario branch information stored beforehand corresponding to the location determined.

In the fifth aspect of the present invention, the computer program stored on the computer readable recording medium is further characterized in that, in a case where a game is allowed to proceed, a game character to be displayed is determined, from one or more game characters stored beforehand, corresponding to the determined location to vary the progression of the game.

In the fifth aspect of the present invention, the computer program stored on the computer readable recording medium is characterized in that, an item has an attribute for giving a variation to a game progression, and in a case where a game is allowed to proceed, an item to be displayed is determined, from one or more items stored beforehand, corresponding to the determined location to vary the progression of the game.

In the fifth aspect of the present invention, the computer program stored on the computer readable recording medium is further characterized in that, before a game is allowed to proceed, programs and data of the game are acquired from a base station or other apparatus which can communicate with the base station. In a case where the game is allowed to proceed, the game is allowed to proceed in accordance with the acquired programs and data of the game.

According to a sixth aspect of the present invention, a computer readable recording medium in which programs of a game to be executed on a mobile terminal which can receive radio signals transmitted from each of a number of base stations are stored is characterized by storing the programs for allowing the computer to detect radiowave reception intensity of radio signals transmitted by the base stations. The computer also executes the game according to the radiowave reception intensity detected in the course of the progression of the game, which is carried out in response to operation input, and displays images in response to the progression of the game.

BRIEF DESCRIPTION OF THE DRAWINGS

FIG. 4 is a view showing an exemplary data structure of the character control table stored in a game data storage region of the RAM of FIG. 3;

FIG. 5 is a view showing an exemplary data structure of the item control table stored in a game data storage region of the RAM of FIG. 3;

FIG. 6 is a view showing an exemplary data structure of the scenario control table stored in a game data storage region of the RAM of FIG. 3;

FIGS. 10A and 10B are views showing an example of character images that appear on a display in step S207 of the game processing of FIG. 9;

FIG. 14 is a view showing an exemplary data structure of the character control table stored in a game data storage area of the RAM of FIG. 13;

FIG. 15 is a view showing an exemplary data structure of the item control table stored in a game data storage area of the RAM of FIG. 13;

FIG. 16 is a view showing an exemplary data structure of the scenario control table stored in a game data storage area of the RAM of FIG. 13;

DESCRIPTION OF THE PREFERRED EMBODIMENTS

The embodiments relating to the present invention are explained in detail below with reference to the drawings.

Furthermore, a first embodiment describes the case in which the present invention is applied to a portable telephone set.

First Embodiment

Figure 1:
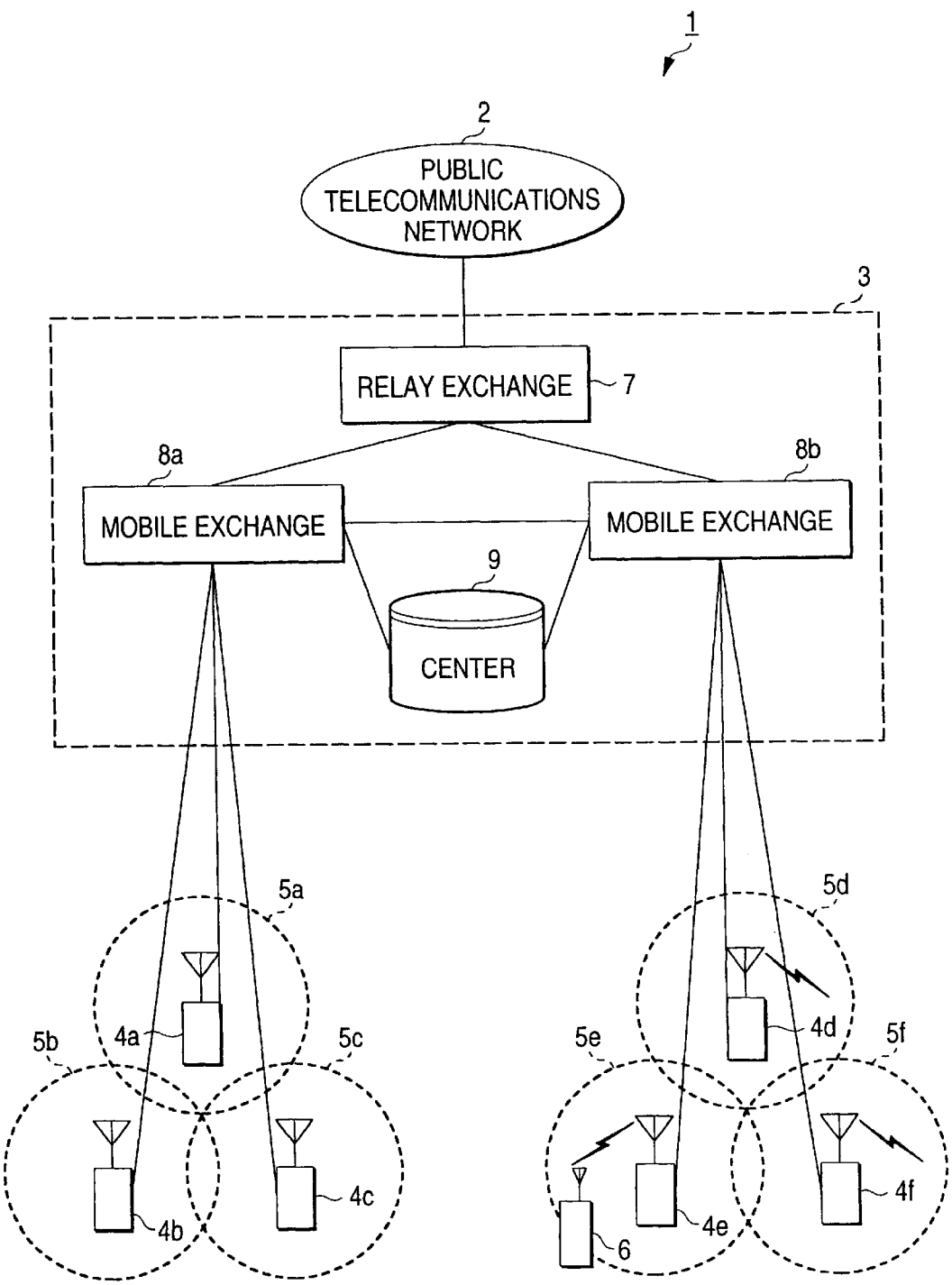
FIG. 1 is a view showing the network configuration of a mobile radio communications system, according to an aspect of the present invention.

FIG. 1 is a view showing the network configuration of a mobile radio communication system, according to an aspect of the present invention. For example, a mobile radio communications system 1 comprises a portable telephone specific network 3 which includes a relay exchange 7, mobile exchanges 8a, 8b, and a center 9. The mobile radio communications system 1 also comprises base stations 4a, 4b, 4c, 4d, 4e, and 4f (hereinafter referred to as 4a–4f) which are connected to a corresponding one of the mobile exchanges 8a, 8b to control each of corresponding radio areas 5a, 5b, 5c, 5d, 5e, and 5f (hereinafter referred to as 5a–5f), and a portable telephone set 6.

In the portable telephone specific network 3, in order to smoothly connect calls to the portable telephone set 6, the portable telephone set 6 has a location in one of the radio areas 5a–5f registered with the center 9.

The outline of the operation of the portable telephone specific network 3 for this location registration is as follows. Each of the base stations 4a–4f transmits within the controlled radio areas 5a–5f via radio a control signal including a base station ID (Identification) code that is uniquely set to each of the base stations. For example, this control signal is transmitted via radio from each of the base stations 4a–4f periodically at predetermined intervals, for example, every several hundreds of a millisecond.

The portable telephone set 6 receives the control signal at the time of absence of speech, that is, during a waiting time. Then, the received control signal is demodulated to detect the base station ID code. Thereafter, the detected base station ID code is compared with the base station ID codes that have been detected previously and stored in the internal memory. In cases where they do not coincide with each other, the portable telephone set 6 transmits a request for location registration to a corresponding base station. Upon receiving the request for location registration from the portable telephone set 6, the portable telephone specific network 3 updates the location registration information, which has been registered with the center 9, corresponding to the portable telephone set 6.

The present invention makes use of base station ID codes included in the control signals that are transmitted by the base stations 4a–4f via radio in order to control the contents of games to be executed at the portable telephone set 6.

Figure 2:
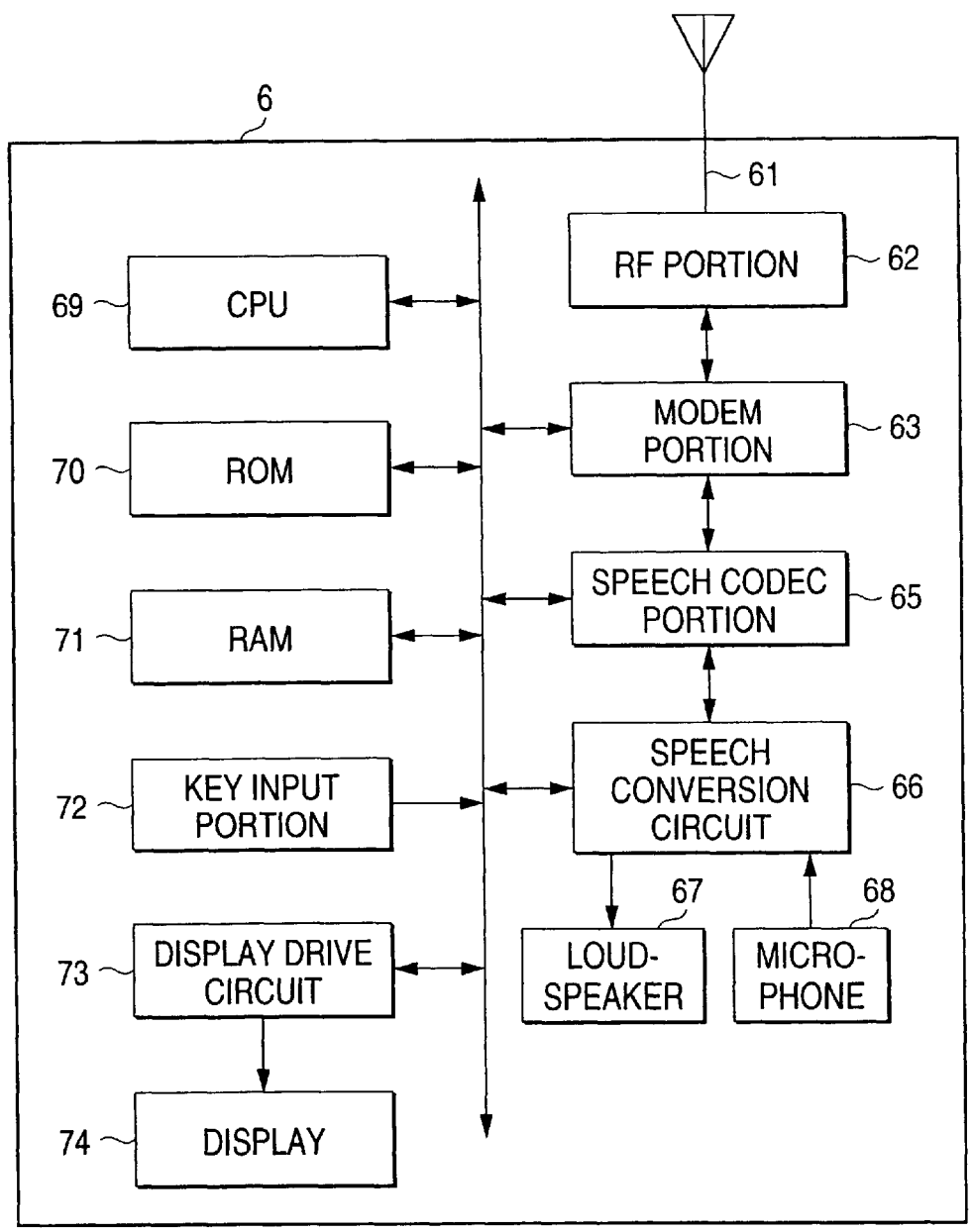
FIG. 2 is a block diagram showing the circuit configuration of a portable telephone set, according to a first embodiment.

FIG. 2 is a block diagram showing an exemplary circuit configuration of the portable telephone set 6 of FIG. 1. The portable telephone set 6 comprises, for example, an antenna 61, a RF (Radio Frequency) portion 62, a MODEM portion 63, a speech code portion 65, a speech conversion circuit 66, a loudspeaker 67, a microphone 68, a CPU (Central Processing Unit) 69, a ROM (Read Only Memory) 70, a RAM (Random Access Memory) 71, a key input portion 72, a display drive circuit 73, and a display 74.

The signal received by the antenna 61 is amplified and is subjected to frequency conversion. Then, demodulating processing is performed in the MODEM portion 63 to extract data required from the received signal. Digital speech data included in the received data is expanded in the speech codec portion 65 to be output via the speech conversion circuit 66 and the loudspeaker 67.

On the other hand, an analog speech signal to be input from the microphone 68 is converted into digital speech data in the speech conversion circuit 66 and then compressed in the speech codec portion 65. The compressed digital speech data or other data to be transmitted are subjected to modulation processing in the MODEM portion 63. Then, they are subjected to frequency conversion, amplification, and the like in the RF portion 62, and thereafter transmitted via radio from the antenna 61.

The CPU 69 executes ID code storage processing (refer to FIG. 8) and game processing (refer to FIG. 9) in accordance with programs stored in the ROM 70. The ROM 70 stores programs and data therein for controlling the communications function and game function to be implemented at the portable telephone set 6.

For example, the ROM 70 stores the programs and data for controlling the ID code storage processing (refer to FIG. 8), which is described later. The ROM 70 also stores the game programs for controlling the game processing (refer to FIG. 9), which is described later, and the data required for controlling the progression of games. The data required for controlling the progression of games are, for example, a character control table (refer to FIG. 4), an item control table (refer to FIG. 5), a scenario control table (refer to FIG. 6), image data of characters and items to appear on the display 74 in response to the execution of games, control data, and scenario data.

The RAM 71 is a memory for storing temporarily programs and data. The key input portion 72 comprises a plurality of control keys. The display drive circuit 73 comprises a circuit for controllably driving the display 74, a display buffer, and a CG (Character Generator). The display 74 comprises a LCD (Liquid Crystal Display) and displays images and letters.

Figure 3:
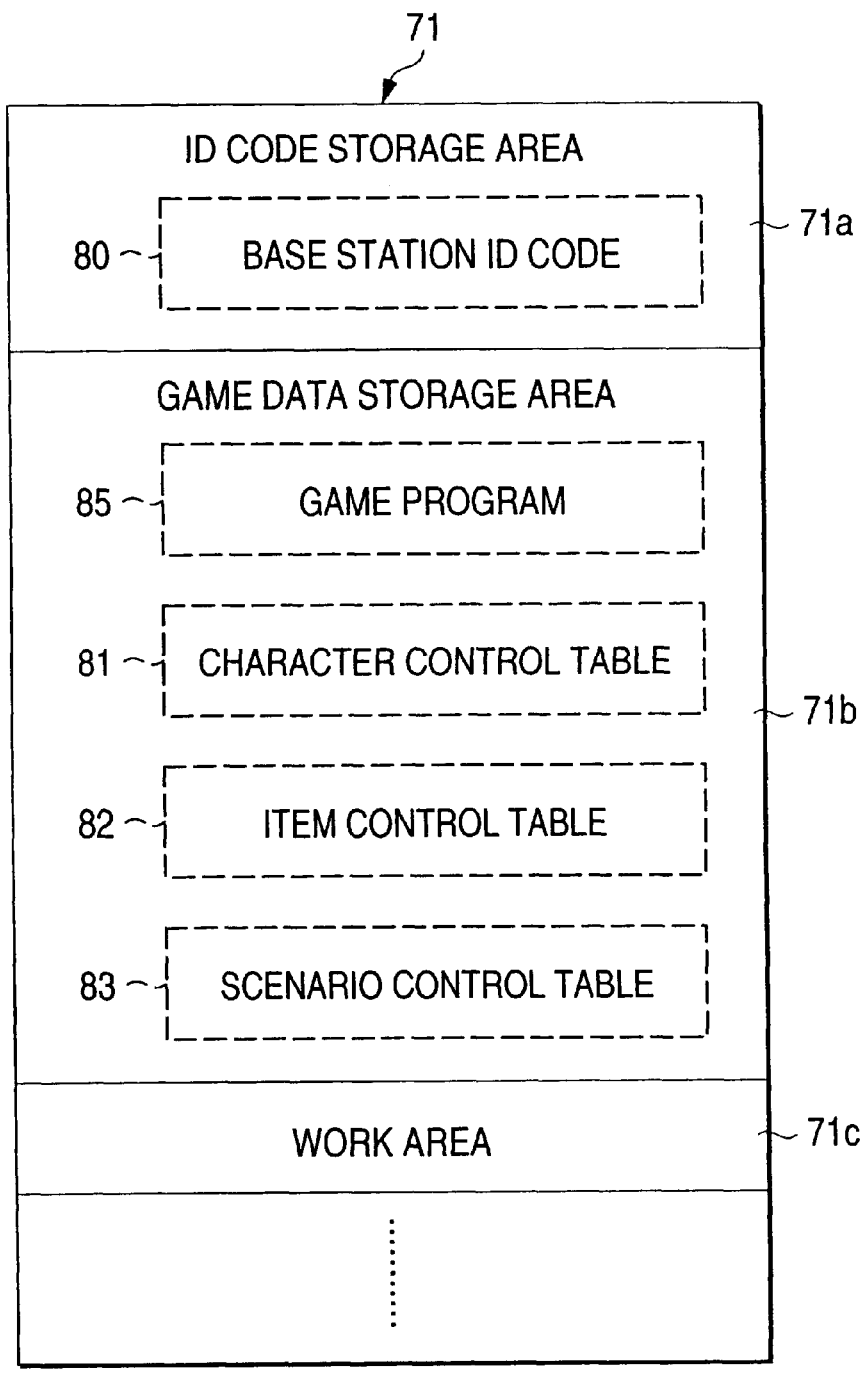
FIG. 3 is a view showing an exemplary memory configuration of the RAM of FIG. 2.

FIG. 3 is a view showing the memory configuration of the RAM 71 of FIG. 2. The RAM 71 has, for example, an ID code storage area 71a, a game data storage area 71b, and a work area 71c.

In the ID code storage area 71a, a base station ID code 80 extracted from a demodulated signal is stored as the current location information of the portable telephone set 6. The base station ID code 80 is constituted by a total of N digits in hexadecimal from the first to $N^{th}$ digit (N is a natural number 8 or greater). A game program 85 for controlling a game, a character control table 81, an item control table 82, and a scenario control table 83, which are to be described later, are read from the ROM 70 to be stored in the game data storage area 71b as required. In the work area 71c, programs and data, read from the ROM 70 as required, for controlling the communications function are stored. In addition, image data and control data of characters and items are also read from the ROM 70 as required to be stored in the work area 71c.

FIG. 4 is a view showing an exemplary data structure of the character control table 81 to be stored in the game data storage area 71b of the RAM 71. In the character control table 81, data is stored which is required for determining an enemy character fighting a player character when the player character, which the user manipulates during the game, combats the enemy character.

The character control table 81 has, for example, an "ID code class" column 81a and an "enemy character" column 81b. In the "ID code class" column 81a, class information of base station ID codes is stored. The class information of base station ID codes is a two-digit hexadecimal number. That is, in the "ID code class" column 81a, hexadecimal numbers of two digits from "00"–"FF" are stored. In the "enemy character" column 81b, one or more types of enemy characters are stored corresponding to the class information to be stored in the "ID code class" column 81a.

In order to determine an enemy character to combat against, a numeric value of two successive digits from a predetermined digit is first detected from the base station ID code 80 of N digits, which is stored in the ID code storage area 71a. After that, in the character control table 81, an enemy character to combat against is determined from one or more enemy characters that are associated with the aforementioned detected two digit numeric value.

FIG. 5 is a view showing an exemplary data structure of the item control table 82 to be stored in the game data storage area 71b of the RAM 71. In order to generate a new item during a game, there is stored, in the item control table 82, data required for determining the item.

The item control table 82 has, for example, an "ID code class" column 82a and an "item" column 82b. In the "ID code class" column 82a, class information of base station ID codes is stored. The class information of base station ID codes is a two-digit hexadecimal number. That is, in the "ID code class" column 82a, hexadecimal numbers of two digits from "00"–"FF" are stored. In the "item" column 82b, one or more types of items are stored corresponding to the class information to be stored in the "ID code class" column 82a.

In order to determine a new item to be generated, a numeric value of two successive digits from a predetermined digit is first detected from the base station ID code 80 of N digits, which is stored in the ID code storage area 71a. Subsequently, in the item control table 82, an item to be generated is determined from one or more items that are associated with the aforementioned detected two digit numeric value.

FIG. 6 is a view showing an exemplary data structure of the scenario control table 83 to be stored in the game data storage area 71b of the RAM 71. In the scenario control table 83, data is stored which is required to determine a branch scenario when the progression of a game is branched during the game.

The scenario control table 83 has, for example, a "branch point No." column 83a, an "ID code class" column 83b, and a "branch scenario" column 83c. In the "branch point No." column 83a, branch point information is stored which branches the progression of a scenario of a game. In the "ID code class" column 83b, class information of base station ID codes is stored. The class information of base station ID codes is group class information of two-digit hexadecimal numbers. That is, in the "ID code class" column 83a, group class information of two-digit hexadecimal numbers from "00"–"FF" is stored. For example, in the scenario control table 83 shown in FIG. 6, two pieces of ID code class information, which include group class information from "00" to "7F" and group class information from "80" to "FF", are stored in the "ID code class" column 83b corresponding to branch point 1. In the "branch scenario" column 83c, branch scenario ID information is stored corresponding to each class of information to be stored in the "ID code class" column 83b.

Figure 7A:
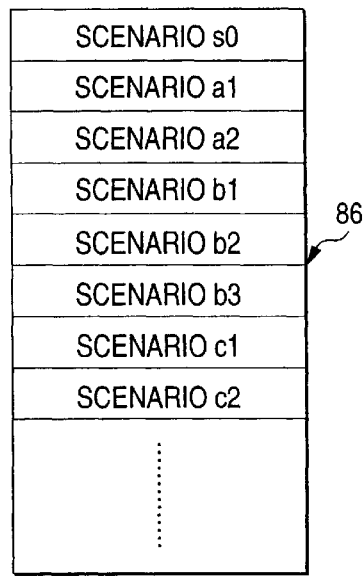
FIGS. 7A and 7B are explanatory conceptual views showing the scenario branch of a game.
Figure 7B:
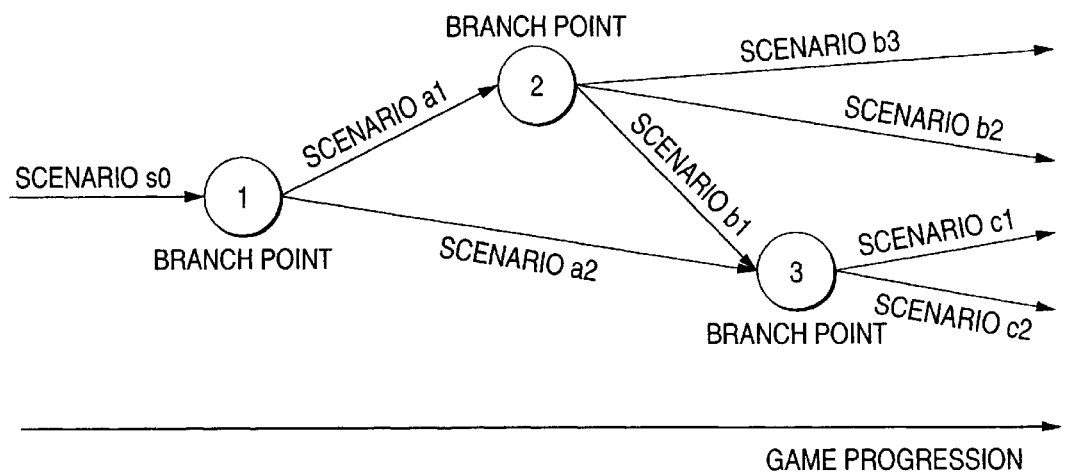

FIGS. 7A and 7B are explanatory conceptual views showing scenario branches. FIG. 7(a) is a view showing an exemplary data structure of scenario data. As shown in FIG. 7(a), scenario data 86 of a game comprises head scenario so that is a scenario of the outset portion of the game and not branched and each of branch scenarios a1, a2, b1, b2, b3 and so forth. The scenario data 86 is stored in the ROM 70 and will be stored in the work area 71c of the RAM 71 in response to the progression of the game.

FIG. 7(b) is a schematic diagram showing the relationship between the progression of a game and scenario branches. As shown in FIG. 7(c), when any one of branch points is reached in the course of the progression of the game, one of the branch scenarios is selected in accordance with the value of the base station ID code 80 stored in the ID code storage area 71a. Then, later progression of the game is controlled following the selected branch scenario.

To explain in more detail, when any one of the branch points is reached in the course of the progression of a game, the No. of the branch point reached is first determined. In addition, a numeric value of two successive digits from a predetermined digit is detected from the base station ID code 80 of N digits, which is stored in the ID code storage area 71a. Subsequently, in the scenario control table 83 (refer to FIG. 6), it is identified which ID code class corresponding to the determined branch point No. the detected two-digit numeral value is associated with. Thereafter, the branch scenario information corresponding to the identified ID code class is acquired and the corresponding branch scenario data is read from the scenario data 86 of the ROM 70 to be transferred to the work area 71c of the RAM 71. Thus, the later progression of the game is controlled in accordance with the branch scenario transferred to the work area 71c.

Furthermore, the aforementioned class information of the base station ID codes that is stored in the "ID code class" columns 81a, 82a, 83b is not limited to the aforementioned two-digit hexadecimal numbers. That is, the class information may be a hexadecimal number having four digits constituted by each of the $(N-6)^{th}$ digit, the $(N-e)^{th}$ digit, the $(N-1)^{th}$ digit, and the $N^{th}$ digit of the N-digit base station ID code, and thus may be changed as appropriate. In addition, such a configuration may be employed to perform operation using numerical values of part of or all of the digits of a base station ID code and then the class information of the base station ID code is set in accordance with the value of the solution. Moreover, the base station ID code may be constituted by numeric values other than hexadecimal numbers, for example, decimal numbers. Furthermore, the number of digits of the base station ID code may be 8 bits or less.

Next, the specific operation of the portable telephone set 6 according to the first embodiment is explained.

In some cases, the control carried out in the portable telephone set 6 includes such control that a circuit other than the CPU 69 performs in cooperation with the CPU 69. For convenience in explanation, in the explanation that follows, the explanation will be given on the precondition that the control to which the CPU 69 is related is under direct control of the CPU 69. In addition, programs and data, which are required for implementing the communications function and game function, are transferred from the ROM 70 to the RAM 71 successively in accordance with the command of the CPU 69 in response to the situation of the progression of processing. However, in the explanation given below, for ease of understanding of the present invention, a description of reading data from the ROM 70 and transferring data to the RAM 71 will not given in detail.

Figure 8:
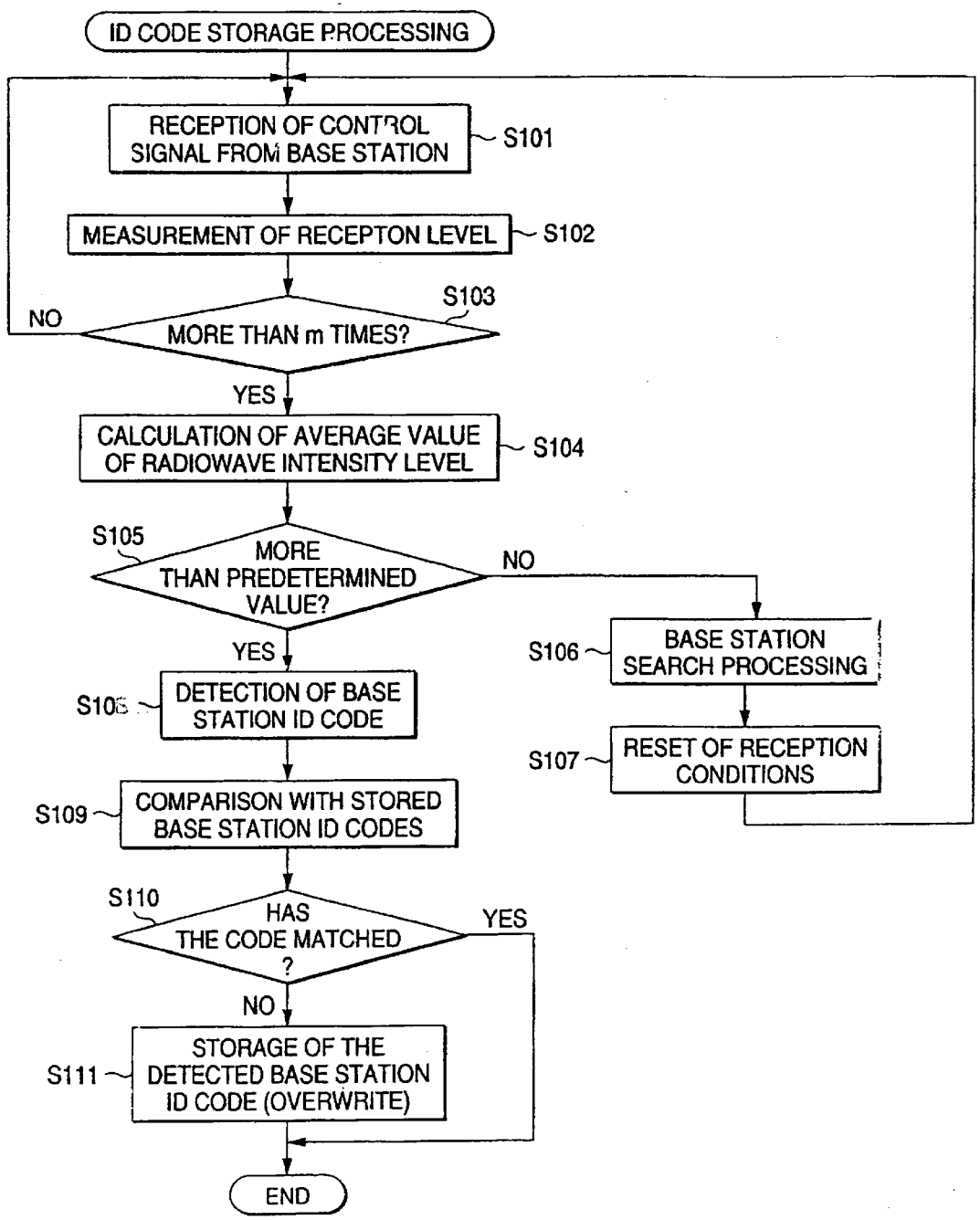
FIG. 8 is a flow diagram showing an example of ID code storage processing.

FIG. 8 is a flow diagram showing an embodiment of ID code storage processing. This ID code storage processing shows the case where control signals are intermittently received, which are transmitted via radio from base stations, during a waiting period of the portable telephone set 6. For example, the base station transmits a control signal every several hundreds of a millisecond "m/sec". The ID code storage processing is carried out successively in accordance with an interrupt request in order to receive the control signal transmitted from the base station at the time of absence of speech in the portable telephone set 6, that is, during the waiting time thereof.

When the processing is started, the CPU 69 initially receives a control signal that is periodically transmitted via radio from the base station that controls the radio area to which the portable telephone set 6 belongs (step S101). Then, the CPU 69 measures the radiowave intensity level of the control signal received (step S102). Subsequently, the CPU 69 repeats the processing of the step S101 and S102 m times (m is a natural number) (step S103), and calculates the average value of the radiowave intensity level of the m control signals received (step S104). Then, the CPU 69 determines whether the calculated average value of the radiowave intensity level is greater than or equal to the predetermined value that has been set beforehand (step S105).

When the average value of the radiowave intensity level has not reached the predetermined value, the CPU 69 determines that the portable telephone set 6 has moved to a radio area of another base station and then carries out the base station search processing (step S106). Then, the CPU 69 makes the setting to receive intermittently a control signal from the base station searched (step S107) and thereafter returns to step S101.

On the other hand, when it has been determined in the aforementioned step S105 that the average value of the radiowave intensity level has reached the predetermined value, the control signal received for a $m^{th}$ time is demodulated to detect the base station ID code (step S108). Then, the CPU 69 compares the base station ID code 80 that has been previously detected and stored in the ID code storage area 71*a* with the base station ID code that has been detected in step S108 (step S109). Then, it is determined whether the comparison results in matched codes (step S110). When the comparison results indicate that there is no match, the CPU 69 transmits a request for location registration to the base station to allow the portable telephone specific network 3 to perform the location registration processing. Then, the base station ID code that has been detected in step S108 is stored in the ID code storage area 71*a* as the new location information of the portable telephone set 6 (step S111). After step S111 and when there is a match, the process ends.

By carrying out this ID code storage processing, the base station ID code is stored in the ID code storage area 71*a* as the current location information of the portable telephone set 6. Furthermore, the ID code storage processing is carried out successively in accordance with an interrupt request even during the execution of the game processing (refer to FIG. 9), which is described later.

Figure 9:
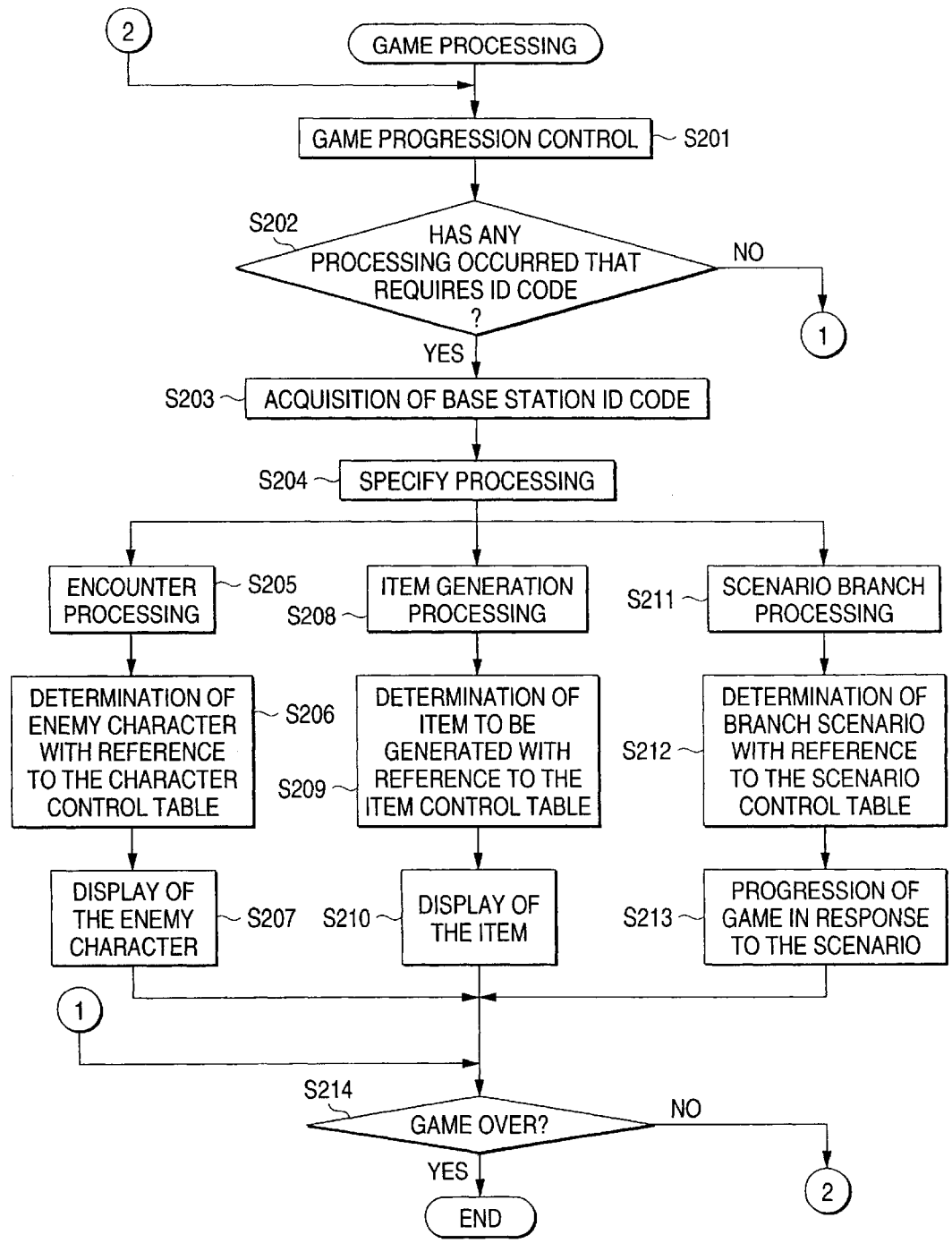
FIG. 9 is a flow diagram showing an example of the processing of a game.

FIG. 9 is a flow diagram showing an example of the game processing. The game processing is carried out during the waiting time of the portable telephone set 6 and when the user operates the key input portion 72 to input a start request of a game. The CPU 69 starts the game in accordance with the game program 85 stored in the game data storage area 71*b* of the RAM 71 and performs the control relating to the progression of the game (step S201). For example, the CPU 69 responds to the operation input of the user to move the player character appearing on the display 74 or perform control of combat against an enemy character.

Subsequently, it is determined during the control relating to the progression of the game that processing executed by using a base station ID code has occurred (step S202). The processing executed by using a base station ID code is, for example, encounter processing for determining an enemy character to combat against, item generation processing for generating a new item, or scenario branch processing for controlling the branching of scenarios.

The presence or absence of occurrence of the encounter processing is determined as follows. That is, during the period in which the player character is moving on a game map, operational processing is carried out which allows combat against an enemy character to occur in accordance with a predetermined probability. When the operation processing works out that combat against an enemy character has occurred, it is determined that the execution of the encounter processing has occurred.

Moreover, the presence or absence of occurrence of the item processing is determined as follows. That is, when the player character has won the combat with the enemy character or an operational command has been given for opening a treasure box (item box) located on the game field, it is determined that the execution of the item processing has occurred.

Furthermore, the presence or absence of occurrence of the scenario branch processing is determined as follows. That is, when the game has progressed up to a pre-set branch point of the scenario in the course of the progression of the game, it is determined that the execution of the scenario branch processing has occurred. In addition, when a pre-set scenario branch condition is met during the game such as in the case where various types of parameters, associated with the player character, which indicate the combat ability of the player character satisfy a certain condition, it is determined that the execution of the scenario branch processing has occurred.

In the case where processing that requires a base station ID code, that is, the aforementioned encounter processing, the item generation processing, and the scenario branch processing has not occurred, the process will move on to step S214. On the other hand, in cases where the execution of any one of the encounter processing, the item generation processing, and the scenario branch processing has occurred, the base station ID code 80 stored in the ID code storage area 71*a* is acquired first (step S203). Then, the type of the processing that has occurred is identified (step S204).

In the case of the occurrence of the encounter processing (step S205), the character control table 81 (refer to FIG. 4) is referred to first to identify the ID code class to which the base station ID code 80 belongs that has been acquired in step S203. Then, from one or more enemy characters associated with the ID code class that has been identified, the type of enemy character to combat is determined, for example, by means of random numbers (step S206). Then, the image data and control data of the determined enemy character are read from the work area 71*c* of the ROM 70 or the RAM 71 and allowed to be displayed on the display 74 (step S207), and thereafter the process will move on to step S214.

FIG. 10(*a*) and FIG. 10(*b*) show examples of character images to be displayed on the display 74 according to the game processing of FIG. 9. FIG. 10(*a*) shows an example of the screen display where the portable telephone set 6 is located in the radio area of base station A with the base station ID code that belongs to an ID code class of "00" in the character control table 81 shown in FIG. 4. When the ID code class is "00", three enemy characters, EC1, EC2, and EC3 are possibly displayed as combat opponents as shown in FIG. 4. The character images corresponding to these three enemy characters, EC1, EC2, and EC3 are character image 91 (EC1), 92 (EC2), and 93 (EC3) in FIG. 10(*a*). Accordingly, when the portable telephone set 6 is located in the radio area of base station A, any one of the three screen display examples shown in FIG. 10(*a*) is to be displayed on the display 74 at the time of the encounter.

FIG. 10(*b*) shows an example of the screen display where the portable telephone set 6 is located in the radio area of base station B with the base station ID code that belongs to an ID code class of "01" in the character control table 81 shown in FIG. 4. When the ID code class is "01", two enemy characters, EC3 and EC4 are possibly displayed as combat opponents as shown in FIG. 4. The character images corresponding to these two enemy characters, EC3 and EC4 are character image 93 (EC3) and 94 (EC4) in FIG. 10(*b*). Accordingly, when the portable telephone set 6 is located in the radio area of base station B, any one of the two screen display examples shown in FIG. 10(*b*) is to be displayed on the display 74 at the time of the encounter.

Furthermore, in the screen display examples shown in FIG. 10(*a*) and FIG. 10(*b*), the letters displayed on each of the lower portions of the character images 91, 92, and 93 are control data of enemy characters. The "Name" indicates the name of the enemy character. The "LV" is the level of the enemy character, which is a numeric value indicating a guideline of the strength (the larger the numeral value, the stronger the enemy). In addition, the "HP (Hit Point)" indicates the physical fitness value of the enemy character. The character image data and control data are stored in the ROM 70 and transferred to the work area 71*c* of the RAM 71 as required. The data are then transferred to the display drive circuit 73 to be displayed on the display 74 in response to the display command from the CPU 69.

Furthermore, the screen display examples shown in FIG. 10(*a*) and FIG. 10(*b*) show the case in which only the current positions of the users who are playing the game are different from each other with all other conditions being the same with each other. As such, the enemy characters to combat against can be made different from each other as shown in FIG. 10(*a*) and FIG. 10(*b*) in response to the areas where the users are playing the game.

The encounter processing allows an enemy character being fought to be determined on the condition that the area in which the user is playing the game is within the current location of the portable telephone set 6. Therefore, the user can combat a different enemy character according to the area in which the user is playing the game with the portable telephone set 6. Consequently, the user can play the game in a different area to enjoy playing against a new enemy character and thus the interest in the game can be enhanced.

In addition, such a game may be conceivable in which the user can use, as his player character, the enemy character that the user has fought and defeated. In this case, from the fact that different enemy characters appear depending on the area, the user will have fun moving to various areas in order to obtain various characters to play the game. In addition, the user is allowed to exchange information, with other users in different areas, as to which characters are available in which areas. Thus, the portable telephone set 6 can enhance not only the interest in the game but also the usefulness of the portable telephone set 6 itself as a communications tool. Moreover, for example, in the case where the portable telephone set 6 is currently located in northeastern parts of Japan, "Namahage" which is a monster handed down in the northeastern parts of Japan can be allowed to appear in the game. Thus, the appearance control of characters that makes the most of locality can be performed.

On the other hand, if the processing that has occurred is the item generation processing (step S208), the item control table 82 (refer to FIG. 5) is referred to first in order to identify the ID code class to which the base station ID code 80 acquired in step S203 belongs. Then, the type of the item to be generated is determined, for example, by means of random numbers, from one or more items that have been associated with the ID code class identified (step S209). Then, the image data and control data of the item that has been determined are read from the work area 71*c* of the ROM 70 or the RAM 71 and displayed on the display 74 (step S210), and thereafter the process will move on to step S214.

Figure 11A:
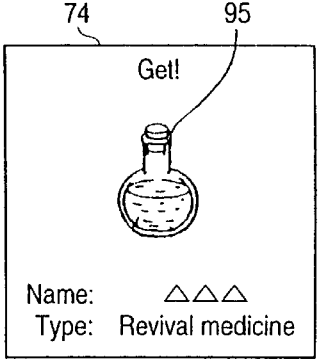
FIGS. 11A and 11B are views showing an example of item images that appear on a display in step S210 of the game processing of FIG. 9.
Figure 11B:
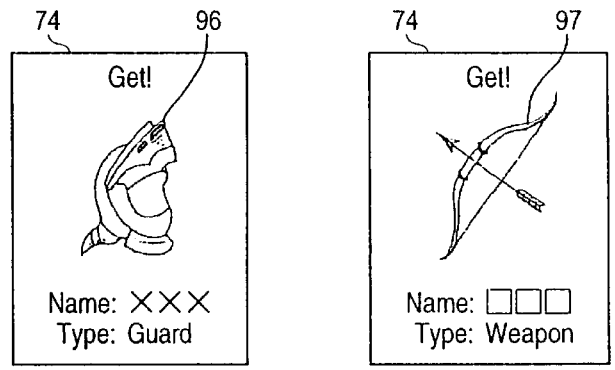

FIG. 11(*a*) and FIG. 11(*b*) show examples of item images to be displayed in the display 74 by the game processing of FIG. 9. FIG. 11(*a*) is a view showing a screen display example where the portable telephone set 6 is located in the radio area of base station A with the base station ID code that belongs to an ID code class of "00" in the item control table 82 shown in FIG. 5. When the ID code class is "00", only item R1 can appear, as shown in FIG. 5. The item image corresponding to the item R1 is an item image 95 (R1) in FIG. 11(*a*). Accordingly, when the portable telephone set 6 is located in the radio area of base station A, the screen display example shown in FIG. 11(*a*) is to be displayed on the display 74 at the time of appearance of an item.

Moreover, FIG. 11(*b*) shows an example of the screen display when the portable telephone set 6 is located in the radio area of base station C with the base station ID code that belongs to an ID code class of "03" in the item control table 82 shown in FIG. 5. When the ID code class is "03", two items R3 and R4 possibly appear as shown in FIG. 5. The character images corresponding to these two items R3 and R4 are item images 96 (R3) and 97 (R4) in FIG. 11(*b*). Accordingly, when the portable telephone set 6 is located in the radio area of base station C, any one of the two screen display examples shown in FIG. 11(*b*) can be displayed on the display 74 at the time of occurrence of items.

Furthermore, in the screen display examples shown in FIG. 11(*a*) and FIG. 11(*b*), the letters that are displayed at each of the lower portions of the item images 95, 96, and 97 are control data of items. The "Name" indicates the name of the item. The "Type" indicates the type of the item. The item image data and control data are stored in the ROM 70 and transferred to the work area 71*c* of the RAM 71 as required. The data are then transferred to the display drive circuit 73 to be displayed on the display 74 in response to the display command from the CPU 69.

Furthermore, the screen display examples shown in FIG. 11(*a*) and FIG. 11(*b*) show the case in which only the current positions of the users who are playing the game are different from each other with all other conditions being the same with each other. As such, the items to be generated can be made different from each other as shown in FIG. 11(*a*) and FIG. 11(*b*) in response to the areas where the users are playing the game.

The item generation processing allows an item generated to be determined on the condition that the area in which the user is playing the game is within the current location of the portable telephone set 6. Therefore, different items can be generated according to the area in which the user is playing the game with the portable telephone set 6. Consequently, from the fact that different items can be acquired depending on the area, the user moves to various areas in order to obtain various items to play the game and thus the interest in the game can be enhanced. In addition, the user is allowed to exchange information, with other users in different areas, as to which items are available in which areas. Thus, the portable telephone set 6 can also enhance the usefulness of the portable telephone set 6 itself as a communications tool. Moreover, controlling generation of items to make the most of locality can also be performed.

On the other hand, if the processing that has occurred is scenario branch processing (step S211), the scenario control table 83 (refer to FIG. 6) is referred to first to determine the branch point No. of the scenario. Then, based on the ID code class corresponding to the determined branch point No., the ID code class to which the base station ID code 80 acquired in step S203 is identified. Then, the scenario of the branch is determined in accordance with the branch scenario information that is associated with the identified ID code class (step S212). Then, the branch scenario data corresponding to the determined branch scenario information is read from the scenario data 86 of the ROM 70 and then transferred to the work area 71c of the RAM 71. Then, the subsequent progression of the game is controlled in accordance with the branch scenario data transferred to the work area 71c (step S213).

Figure 12A:
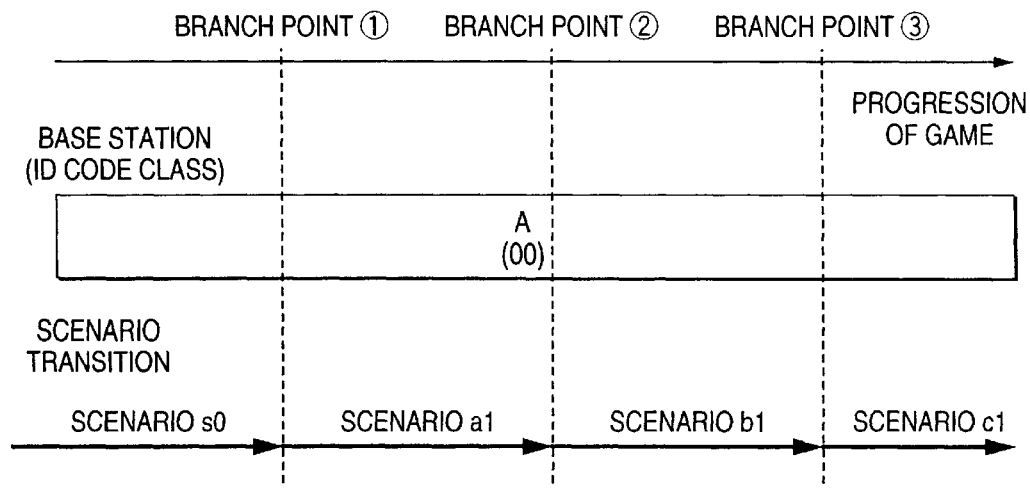
FIGS. 12A and 12B are views showing an example of transition of game scenarios that are controllably branched in the game processing of FIG. 9.
Figure 12B:
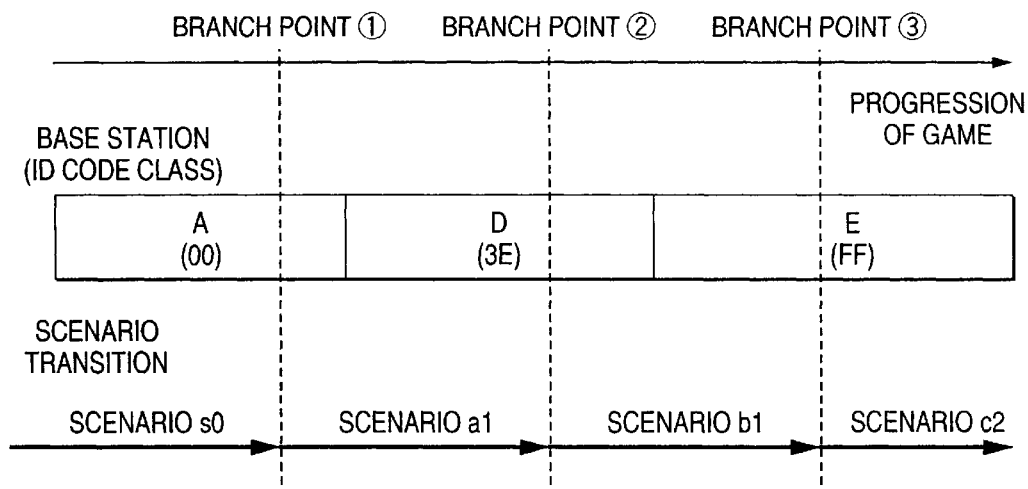

FIG. 12(*a*) and FIG. 12(*b*) are schematic views showing a scenario transition of the game scenarios of which branching is controlled by the game processing of FIG. 9. FIG. 12(*a*) is a view showing the scenario transition when the portable telephone set 6 is located in the radio area of base station A with the base station ID code that belongs to an ID code class of "00". When the portable telephone set 6 is located in the radio area of base station A, the branch scenario at each of the branch points 1, 2, and 3 of the scenario control table 83 of FIG. 6 is as follows. That is, scenario a1 is given at branch point 1, scenario b1 at branch point 2, and scenario c1 at branch point 3. Therefore, when the portable telephone set 6 is located in the radio area of base station A, the scenario transition is effected from scenario s0 through scenario a1 and scenario b1 to scenario c1, as shown in FIG. 12(*a*).

On the other hand, FIG. 12(*b*) is a view showing the scenario transition when the portable telephone set 6 moves sequentially from the radio area of base station A with the ID code class of "00" through the radio area of base station D with the ID code class of "3E" to the radio area of base station E with the ID code class of "FF". Furthermore, the movement timing to another radio area is as shown in FIG. 12(*b*). In this case, the branch scenario at each of the branch points 1, 2, and 3 of the scenario control table 83 of FIG. 6 is as shown below. That is, at branch point 1, the portable telephone set 6 is located in the radio area of base station A with the ID code class of "00", so that the branch scenario is scenario a1. At branch point 2, the portable telephone set 6 is located in the radio area of base station D with the ID code class of "3E", so that the branch scenario is scenario b1. At branch point 3, the portable telephone set 6 is located in the radio area of base station E with the ID code class of "FF", so that the branch scenario is scenario c2.

Therefore, the scenario transition is effected from scenario s0 through scenario a1 and scenario b1 to scenario c2, as shown in FIG. 12(*b*). As such, the branch of a game scenario can be made different depending on the area where the user is playing the game as shown in FIG. 12(*a*) and FIG. 12(*b*).

The scenario branch processing allows scenario branch control to be performed on the condition that the area in which the user is playing the game is within the current location of the portable telephone set 6. Therefore, the game scenario can be differently branched according to the area in which the user is playing the game with the portable telephone set 6. Consequently, the user may move to various areas in order to enjoy various scenarios to play the game and thus the interest in the game can be enhanced. In addition, the user could enjoy the same game differently many times at different areas where the user plays the game. Moreover, in order to enjoy various scenario branches, the user may exchange information with other people at different areas and thus the portable telephone set 6 can also enhance the usefulness of the portable telephone set 6 itself as a communications tool. Moreover, the branch control of a scenario that makes the most of a locality can also be performed.

In step S214, it is determined whether the termination conditions of the game have been established (step S214). The termination conditions are, for example, a case where a request for the termination of the game has been made in accordance with the control signal that is input at the key input portion 72 or a case where the portable telephone set 6 has an incoming call. If the termination conditions have not been established, saving processing such as for saving the data of the game in progress is performed and thereafter the game processing is terminated.

Furthermore, in the aforementioned game processing, the progression of the game is controlled in accordance with only one base station ID code 80 stored in the ID code storage area 71a for identifying the area where the portable telephone set 6 is currently located. The control of the progression of the game means specifically the determination of an enemy character to combat, the determination of an item to be generated, and the control of branching of a game scenario. However, the ID code storage area 71a may be configured to store multiple base station ID codes as a history up to the current time and control the progression of a game using the base station ID codes. That is, this is a configuration in which the progression of the game is controlled in accordance with the transition of areas where the portable telephone set 6 has been located up to the current time.

According to the first embodiment, the portable telephone set 6 receives a control signal transmitted via radio from the base station, or multiple base stations, which controls the radio area where the portable telephone set 6 is currently located. Then, the received control signal is demodulated to detect the base station ID code, which is in turn stored in the ID code storage area 71a. This update processing of the base station ID code is carried out successively during the waiting time, and a latest base station ID code is stored in the ID code storage area 71a. In addition, in the course of the progression of the game, the game is allowed to proceed in accordance with the value of the base station ID code 80 that is stored in the ID code storage area 71a, and the image corresponding to the progression of the game is displayed on the display 74.

Therefore, the contents of the game such as scenario branching during the game and character images and item images to be displayed can be made different in accordance with the area where the user is playing the game. In addition, as the information regarding locations for allowing the contents of the game to differ, base station ID codes are employed which are periodically transmitted from base stations for allowing the location of the portable telephone set 6 to be registered in the mobile radio communications system 1. Therefore, this allows the contents of the game to vary in accordance with the information regarding the current position of the user.

Furthermore, the mobile radio communications system 1 is adapted to use the base station ID codes, as position information, which are periodically transmitted from base stations, thereby providing the advantages to be described below.

That is, as described in Japanese Laid-Open Patent Publication No. 322775 of 1998, when base station identification information (a base station ID code) is used which is acquired in response to an incoming or outgoing call, the base station identification information that is read from the internal memory in the course of the progression of a game is only positional information that is acquired at the time of the incoming or outgoing call. Therefore, this positional information was only positional information regarding the position where the user conducted speech or communications in the past.

However, according to the first embodiment, a control signal that contains a base station ID code is transmitted periodically from the base station and is received successively during the waiting time of the portable telephone set 6. Thus, in the course of the progression of the game, the contents of the game can be varied in accordance with the positional information that shows the current position of the user. Moreover, since the base station ID code is acquired during the waiting time of the portable telephone set 6, the positional information of the user can be acquired without speech or communications by means of the portable telephone set 6.

A Modification of the First Embodiment

Next, a modification of the first embodiment is explained. In the aforementioned first embodiment, described was the case where the base station ID code transmitted via radio from a base station was used to control the progression of the game that is executed at a portable telephone set. In this modification, the progression of the game that is executed at the portable telephone set is controlled further using the radiowave reception intensity of the control signal transmitted via radio from a base station. Furthermore, in this modification, the components and processing that are the same as those of the first embodiment are provided with the same reference numbers as those of the first embodiment, and duplicate explanation is omitted. Explanations are given below only to the points that are different from those of the first embodiment.

Figure 13:
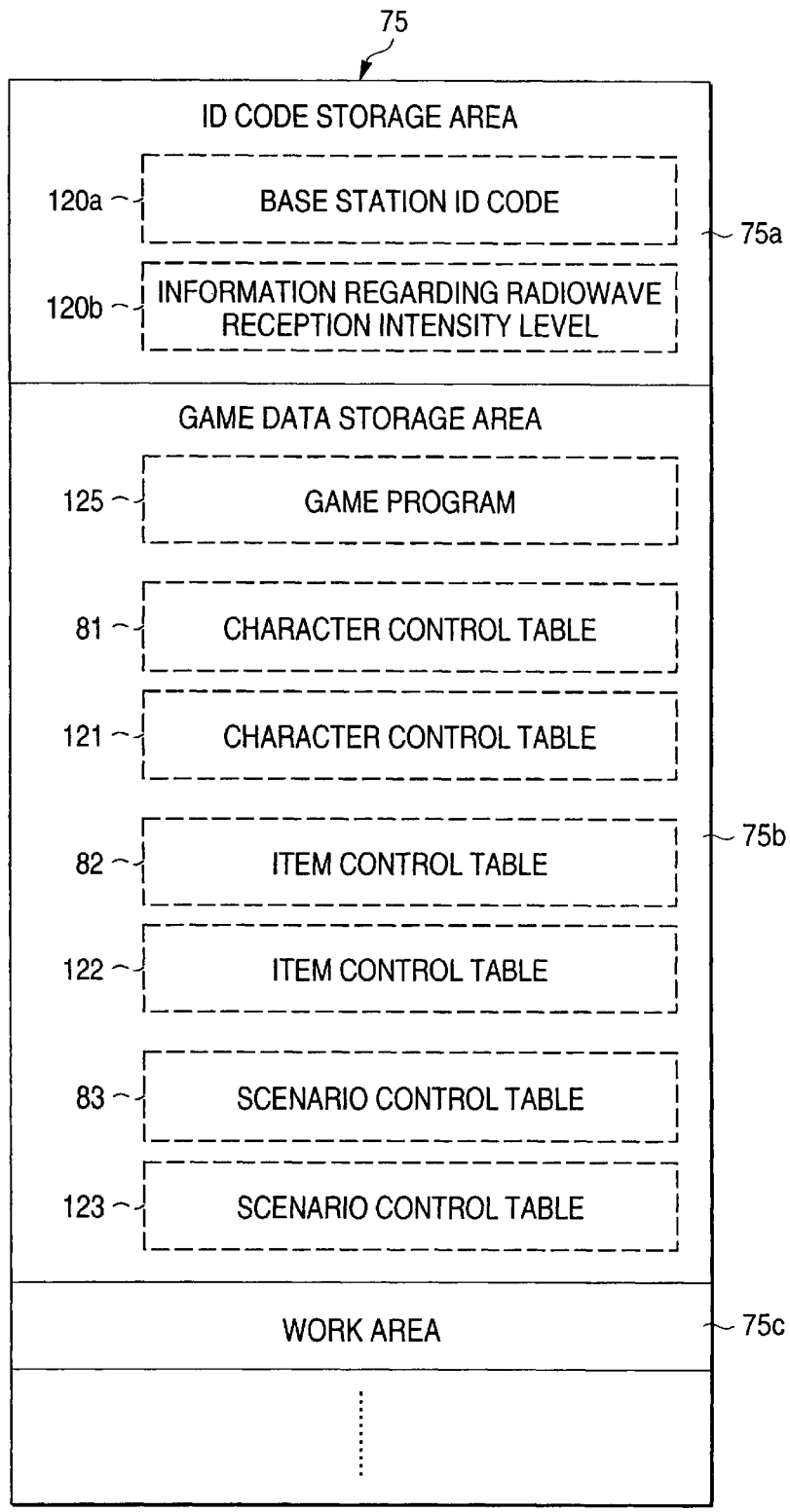
FIG. 13 is a view showing an exemplary memory configuration of the RAM, according to a modification of the first embodiment.

FIG. 13 is a view showing the memory configuration of a RAM of the modification. The RAM 75 has, for example, an ID code storage area 75*a*, a game data storage area 75*b*, and a work area 75*c*.

In the ID code storage area 75*a*, either a base station ID code 120*a* that has been extracted from a demodulated control signal or level information 120*b* regarding the radiowave reception intensity of the control signal is stored. In the ID code storage processing (refer to FIG. 17) to be described later, in the case where the average value of the radiowave intensity levels of the m control signals received is greater than or equal to a predetermined value, that is, when it has been determined that the radiowave reception state is not below a certain level and thus is in a good condition, the base station ID code 120*a* is stored in the ID code storage area 75*a*. Moreover, in the case where the average value of the radiowave intensity levels of the m control signals received is not more than a predetermined value, that is, when it has been determined that the radiowave reception state is not more than a certain level and thus is not in a good condition, the level information 120*b* regarding the radiowave reception intensity of the control signal is stored in the ID code storage area 75*a*.

Like the first embodiment, in the case where the state of the radiowave reception of the control signal is good, the progression of the game is controlled in accordance with the base station ID code 120*a* stored in the ID code storage area 75*a*. Control different from the first embodiment is carried out in the case where the state of the radiowave reception of the control signal is not good. Furthermore, the case where the state of the radiowave reception of the control signal is not good includes, for example, the state immediately after the portable telephone set 6 has been moved into the radio area of another base station, a case where the portable telephone set 6 is located in a space or in a building with no windows, which radiowaves hardly reach, or a case where the portable telephone set 6 is located in a district out of control of the mobile radio communications system.

In this modification, when the state of the radiowave reception of the control signal is not good, the progression of the game is controlled in response to the radiowave reception intensity of the control signal instead of the base station ID code. Accordingly, in the ID code storage area 75*a*, the level information 120*b* regarding the radiowave reception intensity of the control signal is stored in place of the base station ID code 120*a* only when the state of the radiowave reception of the control signal is not good. This level information 120*b* is ranked level 3, level 2, and level 1 in order of increasing radiowave reception intensity.

Stored in the game data storage area 75*b* are the character control table 81 (refer to FIG. 4), the item control table 82 (refer to FIG. 5), and the scenario control table 83 (refer to FIG. 6), which have been described in the first embodiment. Moreover, the game data storage area 75*b* stores a game program 125, a character control table 121, an item control table 122, and a scenario control table 123, which are necessary for the control of the progression of the game in response to the radiowave reception intensity of the control signal. These programs and data are read from the ROM 70 and stored in the game data storage area 75*b*, as required.

FIG. 14 is a view showing an exemplary data structure of the character control table 121 that is stored in the ID code storage area 75*a* of the RAM 75. This character control table 121 is used, at the time of the encounter processing, to determine an enemy character to combat against in response to the radiowave reception intensity of the control signal. The character control table 121 has, for example, a "radiowave reception intensity" column 121*a* and an "enemy character" column 121*b*. In the "radiowave reception intensity" column 121*a*, level information regarding the radiowave reception intensity of the control signal is stored. In the "enemy character" column 121*b*, one or more types of enemy characters are stored corresponding to each of the information levels stored in the "radiowave reception intensity" column 121*a*.

In cases where an enemy character to combat is determined in this modification, it is determined first whether the data stored in the ID code storage area 75*a* is the base station ID code 120*a* or the level information 120*b* regarding the radiowave reception intensity. If it is the base station ID code 120*a*, the enemy character is determined by the method described in the first embodiment in accordance with the corresponding base station ID code 120*a* and character control table 81 (refer to FIG. 4). That is, the enemy character to combat is determined in accordance with the value of the base station ID code 120*a*.

On the other hand, if the data stored in the ID code storage area 75*a* is the level information 120*b* regarding the radiowave reception intensity, the process is carried out as follows. That is, an enemy character to combat against is determined, from one or more enemy characters stored in the character control table 121, corresponding to the level information 120*b* regarding the radiowave reception intensity, which is stored in the ID code storage area 75*a*.

FIG. 15 is a view showing an exemplary data structure of the item control table 122 that is stored in the game data storage area 75*b* of the RAM 75. This item control table 122 is used, at the time of generation of items, to determine an item to be generated in response to the radiowave reception intensity of the control signal. The item control table 122 has, for example, a "radiowave reception intensity" column 122*a* and an "item" column 122*b*. In the "radiowave reception intensity" column 122*a*, level information regarding the radiowave reception intensity of the control signal is stored. In the "item" column 122*b*, one or more types of items are stored corresponding to each of the pieces of the level information that is stored in the "radiowave reception intensity" column 122a.

In cases where a new item to be generated is determined in this modification, it is determined first whether the data stored in the ID code storage area 75a is the base station ID code 120a or the level information 120b regarding the radiowave reception intensity. If it is the base station ID code 120a, the item to be generated is determined by the method described in the first embodiment in accordance with the corresponding base station ID code 120a and item control table 82 (refer to FIG. 5). That is, the item to be generated is determined in accordance with the value of the base station ID code 120a.

On the other hand, if the data stored in the ID code storage area 75a is the level information 120b regarding the radiowave reception intensity, the process is carried out as follows. That is, an item to be generated is determined, from one or more items stored in the item control table 122, corresponding to the level information 120b regarding the radiowave reception intensity, which is stored in the ID code storage area 75a.

FIG. 16 is a view showing an exemplary data structure of the scenario control table 123 to be stored in the game data storage area 75b of the RAM 75. The scenario control table 123 is used to determine the branch scenario in accordance with the radiowave reception intensity of the control signal at the time of branching the scenario progression of the game.

The scenario control table 123 has, for example, a "branch point No." column 123a, a "radiowave reception intensity" column 123b, and a "branch scenario" column 123c. In the "branch point No." column 123a, branch point information is stored which branches the progression of the scenario of a game. In the "radiowave reception intensity" column 123b, level information regarding the radiowave reception intensity of the control signal is stored. In the "branch scenario" column 123c, branch scenario information is stored corresponding to each of the pieces of scenario information that is stored in the "radiowave reception intensity" column 123b.

In this modification example, the branch control of the scenario progression of a game is as shown below. That is, when any one of the branch points is reached in the course of the progression of the game, the number of the branch point that has been reached is determined first. In addition, it is determined whether the data stored in the ID code storage area 75a is the base station ID code 120a or the level information 120b regarding the radiowave reception intensity. If it is the base station ID code 120a, the scenario branch of the game is controlled by the method described in the first embodiment in accordance with the corresponding base station ID code 120a and scenario control table 83 (refer to FIG. 6). That is, the scenario branch is controlled in accordance with the value of the base station ID code 120a.

On the other hand, if the data stored in the ID code storage area 75a is the level information 120b regarding the radiowave reception intensity, the process is carried out as follows. That is, acquired is the branch scenario information stored in the scenario control table 123, corresponding to the determined branch point number and the level information 120b regarding the radiowave reception intensity that is stored in the ID code storage area 75a. Subsequently, the corresponding branch scenario data is read from the scenario data 86 of the ROM 70 and then transferred to a work area 75c of the RAM 75. Then, the subsequent progression of the game is controlled in accordance with the branch scenario data that has been transferred to the work area 75c.

The comparison between the scenario control table 123 shown in FIG. 16 and the scenario control table 83 (refer to FIG. 4) that has been described in the first embodiment indicates the following. That is, taking a look at the case of branch point 1, when the state of the radiowave reception of the control signal is good, the scenario can be branched into scenario a1 or scenario a2 in accordance with the scenario control table 83 (refer to FIG. 4) and the base station ID code 120a. In contrast to this, when the state of the radiowave reception of the control signal is not good, the scenario can be branched into scenario a1 or scenario a2 at level 1, into only scenario a1 at level 2, and into only scenario a3, which is a special scenario, at level 3. As such, when the state of the radiowave reception of the control signal is not good, it is possible to limit the number of alternative branches provided relative to when the state is good, or to add a new alternative.

Next, the operation of the portable telephone set 6 according to this modification is explained.

Figure 17:
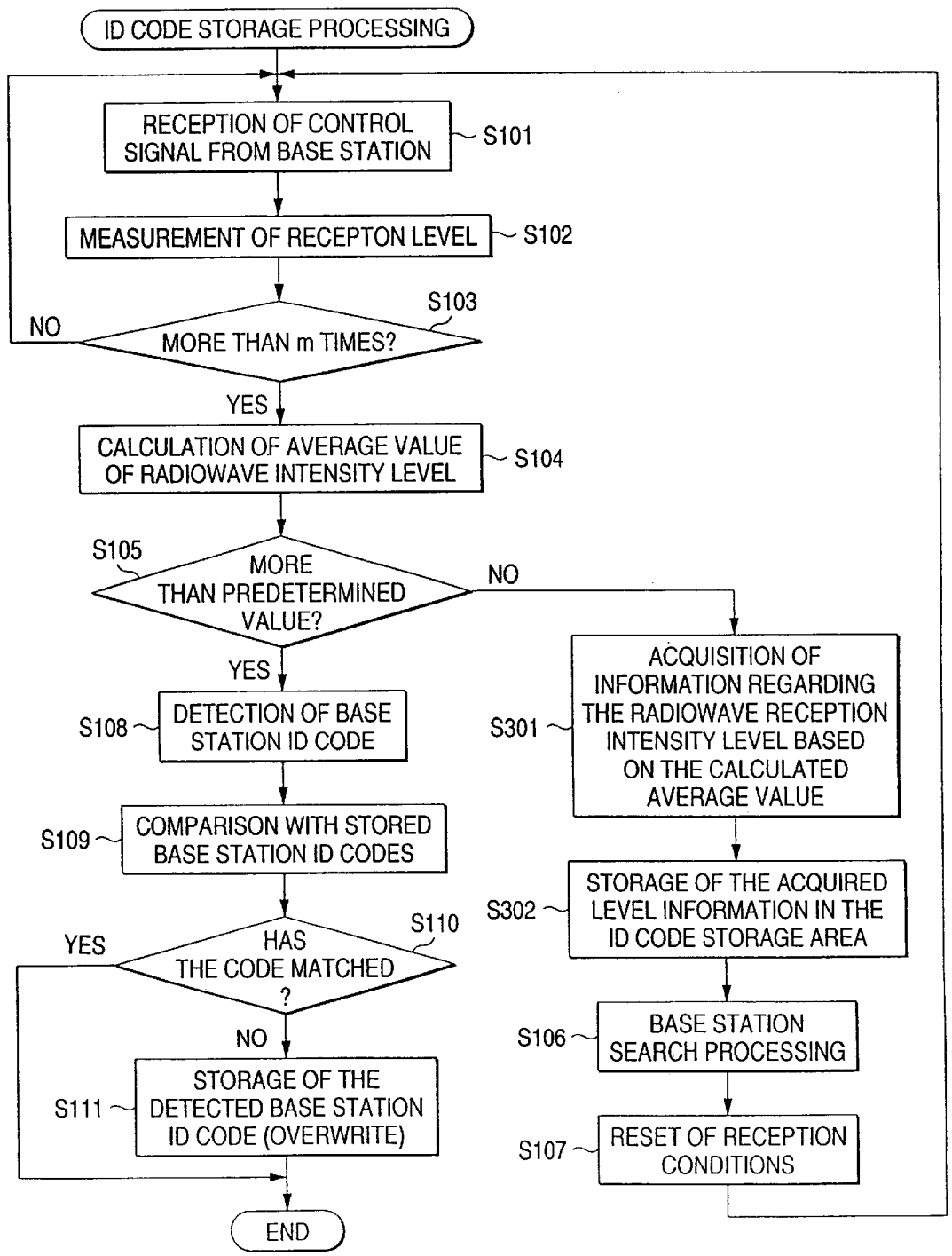
FIG. 17 is a flow diagram showing an example of ID code storage processing, according to a modification of the first embodiment.

FIG. 17 is a flow diagram showing an example of ID code storage processing in this modification. Furthermore, in this ID code storage processing, the same processing steps as those of the ID code storage processing (refer to FIG. 8) that has been described in the first embodiment are provided with the same step numbers as those of the first embodiment and duplicated explanations are omitted. More specifically, in this ID code storage processing, steps S101–S105 and steps S108–S111 are the same as the ID code storage processing that has been described in the first embodiment and therefore detailed explanations are omitted.

In this ID code storage processing, what is different from the ID code storage processing that has been described in the first embodiment is the case where it is determined in step S105 that the average value of the radiowave intensity of m control signals is not greater than a predetermined value. In this case, in this modification, the processing to be described below is executed.

That is, first, in accordance with the average value of the radiowave intensity level of the control signal, which has been calculated in step S104, the level information of the radiowave reception intensity corresponding to the m control signals received is acquired (step S301). The level information of the radiowave reception intensity is ranked level 3, level 2, and level 1 in order of increasing radiowave reception intensity. Numeric data for defining the upper and lower limits of the radiowave intensity has been set beforehand for each level. In step S301, the corresponding level is identified by the comparison between the calculated average value of the radiowave intensities and the numeric data set for each level.

Subsequently, the acquired level information regarding the radiowave reception intensity is stored in the ID code storage area 75a in place of the base station ID code (step S302). Thereafter, the base station search processing is carried out (step S106) and then the setting for receiving intermittently control signals from the searched base station is made (step S107), and then the process returns to step S101.

By carrying out this ID code storage processing, the base station ID code 120a is stored in the ID code storage area 75a in the case where the average value of the radiowave intensity levels of the received m control signals is not below a predetermined value, that is, when the state of the radiowave reception of the control signal is good. Moreover, in the case where the average value of the radiowave intensity levels of the received m control signals is not greater than a predetermined value, that is, when the state of the radiowave reception of the control signal is not good, the level information 120b regarding the radiowave reception intensity for the m control signals is stored in the ID code storage area 75a.

Figure 18:
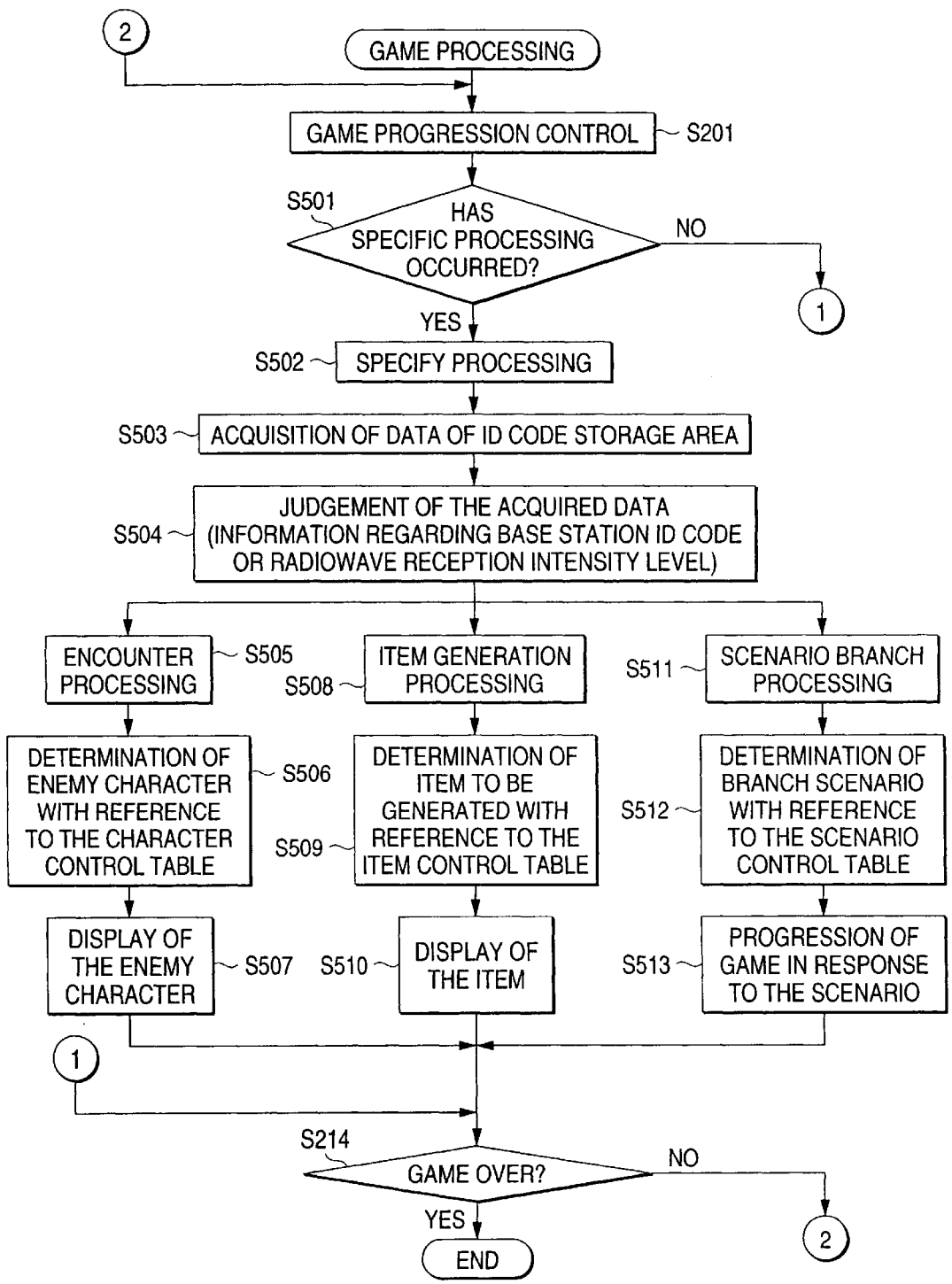
FIG. 18 is a flow diagram showing an example of the processing of a game, according to a modification of the first embodiment.

FIG. 18 is a flow diagram showing an example of the game processing according to this modification. Furthermore, in this game processing, the same processing steps as the game processing (refer to FIG. 9) that has been described in the first embodiment are provided with the same step numbers as those of the first embodiment and duplicated explanations are omitted.

First, during the period of progression control of a game, it is determined whether special processing has been required (step S501). The special processing includes the encounter processing, the item generation processing, or the scenario branch processing. In the case where none of the encounter processing, the item generation processing, and the scenario branch processing has been required, the process will move on to step S214. On the other hand, in the case where any one of the encounter processing, the item generation processing, and the scenario branch processing has been required, the type of the processing that has been required is identified first (step S502). Then, the data stored in the ID code storage area 75a is acquired (step S503). Then, it is determined whether the acquired data is the base station ID code 120a or the level information 120b regarding the radiowave reception intensity (step S504).

In the case where the acquired data is the base station ID code 120a, the determination processing for determining an enemy character to combat against, the item generation processing, and the scenario branch processing are carried out by the method that has been described in steps S205–S213 of the game processing (refer to FIG. 9) according to the first embodiment, in accordance with the corresponding base station ID code 120a and the type of the processing that has been required (steps S505–S513). That is, the progression of the game is controlled in accordance with the base station ID code 120a.

On the other hand, in the case where the data acquired in step S504 is the level information 120b regarding the radiowave reception intensity, the determination processing for determining an enemy character to combat, the item generation processing, and the scenario branch processing are carried out in accordance with the corresponding level information 120b and the type of the processing that has been required (steps S505–S513). That is, the progression of the game is controlled in accordance with the level information 120b regarding the radiowave reception intensity.

More specifically, in the case of the encounter processing (step S505), an enemy character to combat is determined, for example, by means of random numbers, from one or more enemy characters stored in the character control table 121, corresponding to the acquired level information 120b regarding the radiowave reception intensity (step S506). Then, the image and information regarding the determined enemy character are displayed on the display 74 (step S507).

In the case of the item generation processing (step S508), an item to be generated is determined, for example, by means of random numbers, from one or more items stored in the item control table 122, corresponding to the acquired level information 120b regarding the radiowave reception intensity (step S509). Then, the image and information regarding the determined item are displayed on the display 74 (step S510).

Moreover, in the case of the scenario branch processing (step S511), the process is as shown below. That is, the branch point number is described below. That is, the branch point number is determined and then the branch scenario information is acquired, which is stored in the scenario control table 123 corresponding to this branch point number and the acquired level information 120b regarding the radiowave reception intensity (step S512). Then, the corresponding branch scenario data is read from the scenario data 86 of the ROM 70 and then transferred to the work area 75c of the RAM 75. Then, the subsequent progression of the game is controlled in accordance with the branch scenario data transferred to the work area 75c (step S513).

According to this modification example, the portable telephone set 6 receives control signals that are transmitted via radio from a base station, which controls the radio area where the portable telephone set 6 is currently located. Then, the level information regarding the radiowave reception intensity of the control signal received is detected and stored in the ID code storage area 75a. Then, in the course of the progression of the game, the game is allowed to proceed in accordance with the level information regarding the radiowave reception intensity that is stored in the ID code storage area 75a and the images corresponding to the progression of the game are displayed on the display 74. Therefore, in response to the radiowave reception intensity of the control signal, the contents of the game can be made different, such as the scenario branching during the game, and the character images and item images, which are displayed. Furthermore, the radio signal for detecting the radiowave reception intensity may be an outgoing call, an incoming call, or a radio signal, which is transmitted from base stations regarding speech.

Furthermore, the aforementioned first embodiment and the modification example thereof were adapted so that programs and data relating to a game are stored in the ROM 70 beforehand. However, such a configuration may be employed in which the programs and data relating to a given game can be downloaded to the portable telephone set 6 from other apparatus via a base station.

Figure 19:
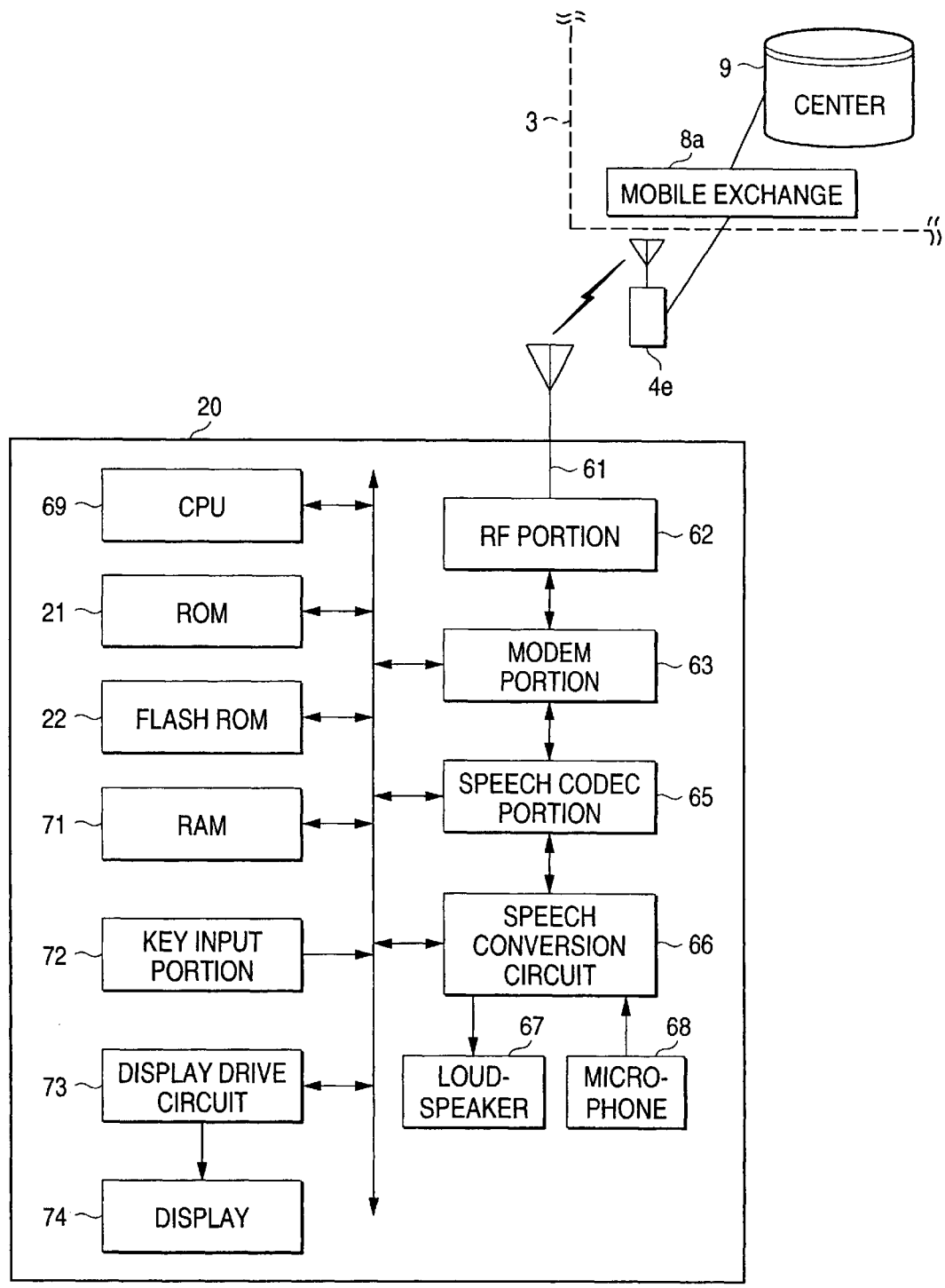
FIG. 19 is a view showing an example of a system for downloading programs and data relating to a game from other apparatus to a portable telephone set via a base station.

FIG. 19 is a view showing an example of a system configuration for downloading programs and data relating to a game to a portable telephone set from another apparatus via a base station. In this example, a plurality of programs and data relating to a game, which are executable in a portable telephone set 20, are controlled by the center 9 of the portable telephone specific network 3. In order to download programs and data relating to a game from the center 9, the portable telephone set 20 carries out data communications with the center 9 via the corresponding base station 4e and the mobile exchange 8a.

The portable telephone set 20 further comprises a flash ROM 22 for storing programs and data relating to the game, which have been downloaded from the center 9. In addition, in a ROM 21, programs and data to be used for functions other than the game function are stored for controlling each of the portions of the portable telephone set 20.

Figure 20:
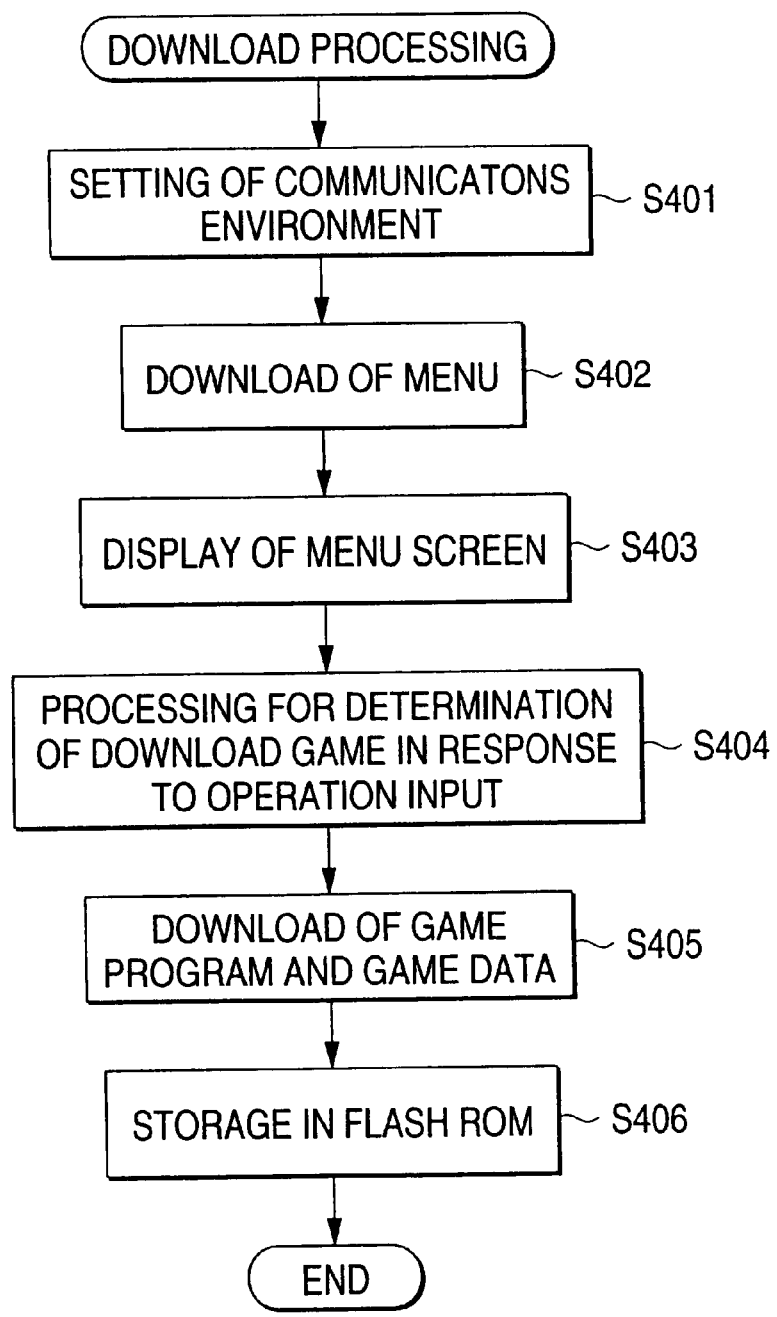
FIG. 20 is a flow diagram showing an example of the download processing to be executed in a portable telephone set.

FIG. 20 is a flow diagram showing an example of the download processing to be executed by the portable telephone set 20. This download processing is executed during the waiting time of the portable telephone set 20 and when the user operates the key input portion 72 to request the download of a game.

When the processing has been started, the portable telephone set 20 prepares a communications environment to carry out data communications with the center 9 via the corresponding base station 4e and mobile exchange 8a (step S5). Subsequently, menu information regarding games controlled by the center 9 and can be downloaded is downloaded (step S40). Then, the downloaded menu information is displayed on the display 74 (step S403).

Thereafter, user operation of the key input portion 72 to input the choice of the game that is to be downloaded causes the game that is to be downloaded to be determined in accordance with the operated input (step S404). Then, the programs and data relating to the game that has been determined are downloaded to the portable telephone set 20 from the center 9 via the base station 4e and mobile exchange 8a (S405) and stored in flash ROM (S406). Subsequently, processing ends.

More specifically, for example, taking the first embodiment as an example, programs relating to the ID code storage processing (refer to FIG. 8) and game processing (refer to FIG. 9), and game data, such as images and information, relating to the character control table (refer to FIG. 4), the item control table (refer to FIG. 5), the scenario control table (refer to FIG. 6), scenario data (refer to FIG. 7), characters, and items can be downloaded.

This download processing makes it possible for the portable telephone set 20 to download and use programs and data from the center 9, relating to the game. Accordingly, this makes it possible to electronically distribute or sell programs and data relating to games as software applications independently of the hardware. Furthermore, such a configuration may be employed to download programs and data relating to games from base stations.

Furthermore, it is also possible to download programs and data for updating, rewriting, or adding part of or all of the game programs or the game data. Such a configuration like this makes it possible for the supplier of games to change the contents of the games supplied, by providing the center 9 with the programs and data for changing the contents of the games. For example, the download of such programs and data to the portable telephone set 20 makes it possible to change enemy characters to combat and items to be generated, and to add new branch scenarios or scenarios for special events to the games.

Figure 21:
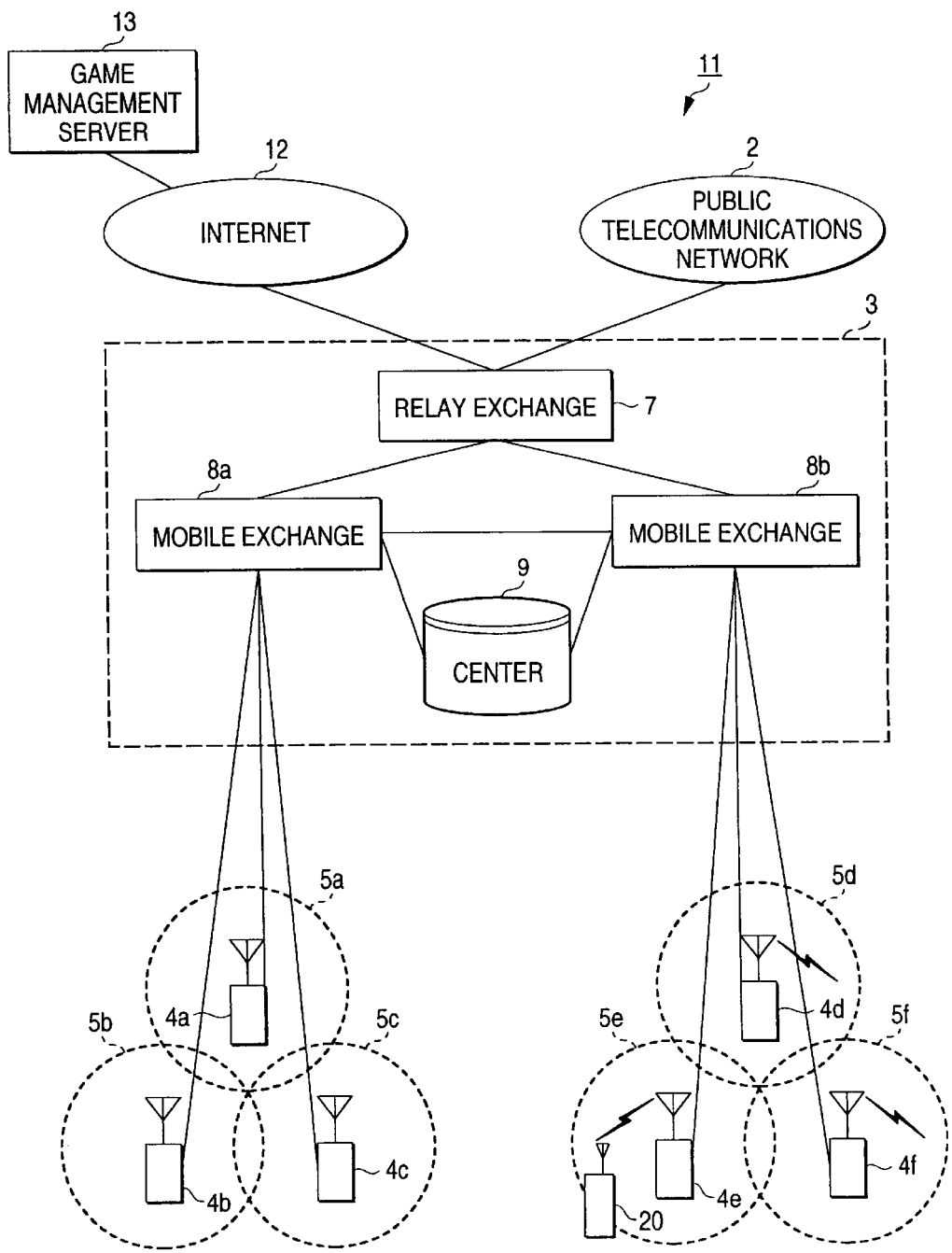
FIG. 21 is a view showing another example of a system for downloading programs and data relating to a game from other apparatus to a portable telephone set via base stations.

FIG. 21 is a view showing an example of the configuration of another system for downloading programs and data relating to a game to a portable telephone set from another apparatus via a base station. In this example, programs and data relating to games that can be executed by the portable telephone set 20 are under the control of a game management server 13 that is coupled to the Internet 12. In addition, the Internet 12 is connected to the relay exchange 7 in the portable telephone specific network 3. In order to download programs and data relating to a game from the game management server 13, the portable telephone set 20 carries out data communications with the game management server 13 via the corresponding base station 4e, the mobile exchange 8a, the relay exchange 7, and the Internet 12. Even with such a configuration, it is possible for the portable telephone set 20 to download the programs and data relating to the game from the game management server 13 and to use them.

Second Embodiment

Next, a second embodiment is explained. The second embodiment is different from the first embodiment in the following points. That is, the first embodiment has described the case where the present invention is applied to a portable telephone set. The second embodiment will describe the case where, in a mobile radio communications system such as a portable telephone set, the present invention is applied to a portable game machine that is provided with a function for receiving control signals transmitted via radio from base stations and a function for extracting a base station ID code from the control signal received.

Accordingly, this second embodiment has a different hardware configuration to which the present invention is applied. Other data structure of tables and procedures for the ID code storage processing and game processing are principally the same as those of the first embodiment. The same structure and processing as those of the first embodiment are provided with the same reference numbers as those of the first embodiment and duplicated explanations are thereby omitted. Only the points that are different from the first embodiment are explained below.

Figure 22:
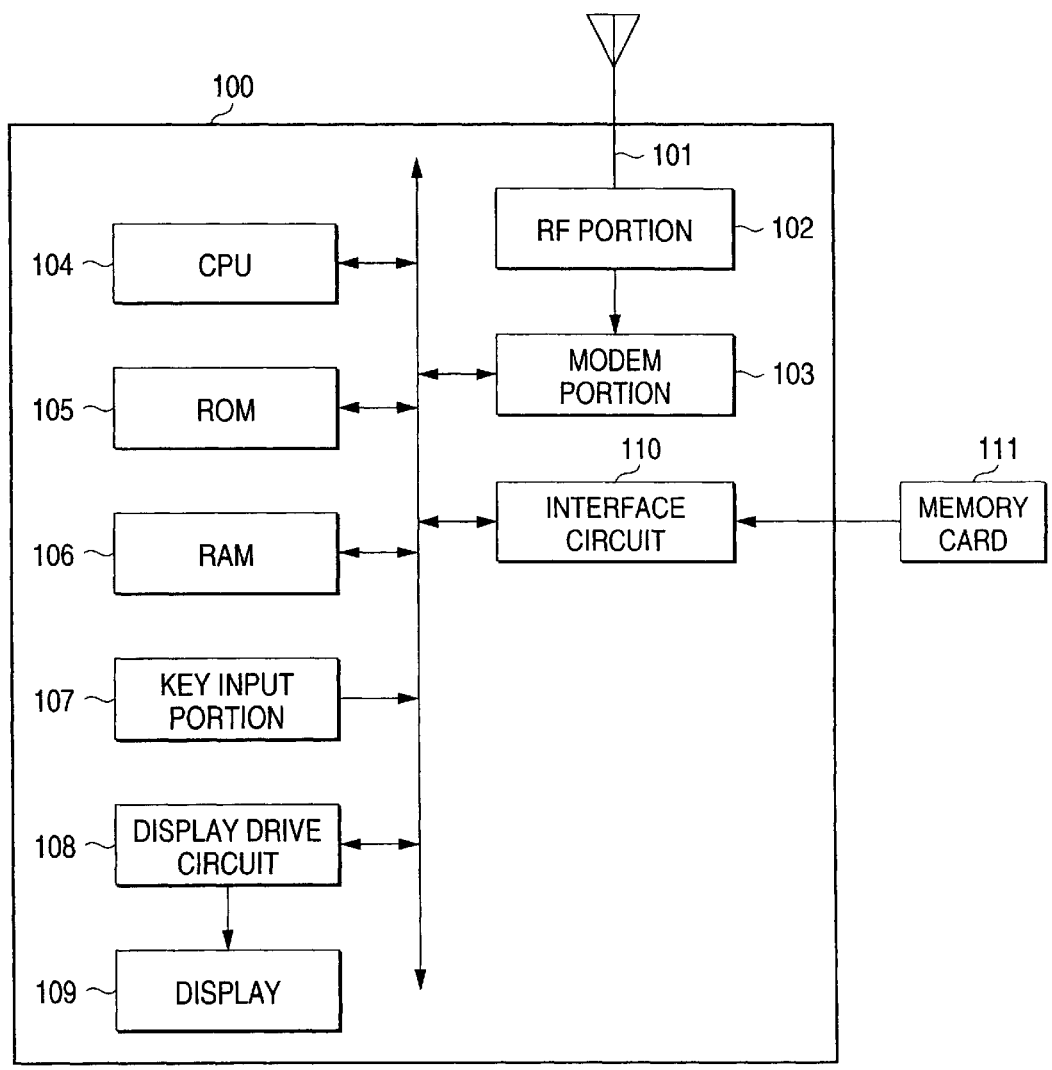
FIG. 22 is a block diagram showing an exemplary circuit configuration of a portable game apparatus, according to a second embodiment.

FIG. 22 is a block diagram showing an exemplary circuit configuration of the portable game machine according to the second embodiment. In the mobile radio communications system 1 of a portable telephone set shown in FIG. 1, this portable game machine 100 has the function for receiving control signals transmitted via radio from the base stations 4a–4f and the function for extracting a base station ID code from the control signal received.

The portable game machine 100 comprises, for example, an antenna 101, a RF portion 102, a demodulation portion 103, a CPU 104, a ROM 105, a RAM 106, a key input portion 107, a display drive circuit 108, a display 109, an interface circuit 110, and a memory card 111.

In the mobile radio communications system 1 of the portable telephone set shown in FIG. 1, control signals, which include base station ID codes, transmitted via radio from the base stations 4a–4f are received by the antenna 101. The signal received by the antenna 101 is amplified and frequency converted in the RF portion 102. Then, demodulation processing is carried out in the demodulation portion 103 to extract necessary reception data. When compared with the antenna 61, the RF portion 62, and the MODEM portion 63 of the portable telephone set 6 shown in FIG. 2 according to the first embodiment, the antenna 101, the RF portion 102, and the demodulation portion 103 have only the functions shown below. That is, they function to receive control signals transmitted via radio from the base stations 4a–4f and function to extract a base station ID code from the control signal received.

The CPU 104 carries out the ID code storage processing (refer to FIG. 8) and game processing (refer to FIG. 9), which have been described in the first embodiment, in accordance with the program stored in the ROM 105 and the memory card 111. Stored in the ROM 105 is an operation system for controlling each portion of the portable game machine 100. The RAM 106 is a memory for storing programs and data temporarily and has the same memory configuration as that of the RAM 71 shown in FIG. 3 in the first embodiment.

The key input portion 107 comprises direction keys and a plurality of control buttons. The display drive circuit 108 comprises a circuit for controllably driving the display 109, a display buffer, and CG. The display 109 comprises a LCD and displays images and letters. The interface circuit 110 is adapted to allow the memory card 111 to be freely mounted or removed.

The memory card 111 is, for example, a memory cartridge or a ROM card. In the memory card 111, programs and data for controlling games to be implemented in the portable game machine 100 are stored. For example, in the memory card 111, programs and data for controlling the ID code storage processing (refer to FIG. 8), which has been described in the first embodiment, are stored. In addition, in the memory card 111, game programs for controlling the game processing (refer to FIG. 9) and data required for controlling the progression of games are stored. The data for controlling the progression of games include, for example, the character control table (refer to FIG. 4), the item control table (refer to FIG. 5), the scenario control table (refer to FIG. 6), and the image data, control data, and scenario data (refer to FIG. 7) of the characters and items which are displayed on the display 109 in response to the execution of games.

Programs and data recorded in the memory card 111 are read and transferred to the RAM 106 as required in response to the command from the CPU 104. That is, the portable game machine 100 reads the programs and data for implementing the present invention into the RAM 106 of the portable game machine 100 and uses them by means of the memory card 111 that is detachably provided in the portable game machine 100. Therefore, it becomes possible to readily distribute and sell the programs and data for implementing the present invention as software applications (the memory card 111) independently of the hardware.

In the portable game machine 100 having such a configuration, carried out are the ID code storage processing (refer to FIG. 8) and the game processing (refer to FIG. 9), which have been described in the first embodiment. However, unlike the portable telephone set 6, which has been described in the first embodiment, the portable game machine 100 has no speech function. Therefore, it is to be understood that the ID code storage processing (refer to FIG. 8) is periodically carried out in accordance with predetermined interrupt requests while the power of the portable game machine 100 is ON or the game processing is being carried out in the portable game machine 100. However, such a configuration may be employed to allow the ID code storage processing to be carried out only when processing that requires a base station ID code in step S202 of the game processing, that is, any one of the encounter processing, the item generation processing, and the scenario branch processing has occurred.

Such a control configuration would implement the same game control even in the portable game machine 100 as in the portable telephone set 6 that has been described in the first embodiment. That is, the portable game machine 100 receives control signals transmitted via radio from a base station, which controls the radio area where the portable game machine 100 is currently located. Then, the portable game machine 100 demodulates the received control signal to extract the base station ID code that is in turn stored in the RAM 106. This update processing of base station ID codes is carried out successively in accordance with a predetermined interrupt request while the power of the portable game machine 100 is ON or the game processing is being carried out in the portable game machine 100. Then, in the course of the progression of a game, the game is allowed to proceed in response to the value of the base station ID code that has been stored in the RAM 106, and images are displayed on the display 109 in response to the progression of the game.

Accordingly, in the portable game machine 100, it is possible to allow the contents of the game such as the scenario branches, and character images and item images that are displayed in the game to differ in accordance with the area where the user is playing the game. On the other hand, the positional information for allowing the contents of the game to differ employs base station ID codes that are transmitted periodically via radio from the base stations 4a–4f in the mobile radio communications system 1 (refer to FIG. 1). Thus, the contents of the game can be varied in accordance with the information regarding the current position of the user.

Furthermore, in the second embodiment, the programs and data for implementing the present invention are stored in the memory card 111, which is in turn used as a recording medium. However, the recording medium is not limited to memory cards. Other magnetic or optical recording media, or semiconductor memories, which are readable by computers, may be employed.

Moreover, in the second embodiment, in order for the portable game machine 100 to acquire positional information, a mobile radio communications system of a portable telephone set was used. However, mobile radio communications systems such as PHS or pagers may be utilized. Furthermore, such facilities as provided uniquely only for purposes of allowing the portable game machine 100 to acquire positional information may be utilized. As the facilities in this case, transmitters for transmitting position identifying information via radio may be prepared in the areas under their own control and these transmitters may be located as appropriate in consideration of their control areas.

In the foregoing, the first and second embodiments and a modification of the present invention have been specifically explained. However, the present invention is not limited to the aforementioned embodiments and modification. As a matter of course, a change may be made in the invention as appropriate without departing from the spirit and scope thereof.

For example, in the aforementioned first embodiment, the case in which the present invention is applied to a portable telephone set has been described. However, the present invention is not limited to portable telephone sets but may be applied to PHS, pagers, or the like. In addition, in the aforementioned second embodiment, the case where the present invention is applied to a portable game machine has been described. However, the present invention is also applicable to an electronic device if the device is provided with the function for receiving control signals transmitted via radio from base stations in a mobile radio communications system and the function for demodulating the received control signal to extract a base station ID code therefrom. For example, the present invention may be applied to electronic notebooks, portable information terminals, or car navigation systems.

Furthermore, the aforementioned first and second embodiments are adapted to allow the contents of games to differ in accordance only with base station ID codes. However, such a configuration may be employed to use other information to allow the contents of the game to differ, in addition to the base station ID code. For example, consider a case where the portable telephone set 6 or the portable game machine 100, which has been described in the aforementioned first or second embodiment, is further comprised of a time clocking function for clocking the current time. In this case, such a configuration may be employed to allow the contents of the game such as scenario branches and the character images and item images that are to be displayed during the game to be varied in accordance with base station ID codes and information regarding the current time that is obtained by the time clocking function.

Furthermore, the aforementioned first and second embodiments are adapted to vary the progression of a game by using base station ID codes as identification information. However, the identification information is not limited to base station ID codes. That is, radio zone ID information or simultaneous calling area ID information may be employed.

Furthermore, in a mobile radio communication system of portable telephone sets employing CDMA (Code Division Multiple Access), the control signal transmitted via radio from a base station includes information regarding the latitude and longitude of the base station. Accordingly, the progression of the game that is executed on a mobile terminal may be varied by using the information regarding the latitude and longitude of the base station in place of the base station ID code. That is, the mobile terminal receives the control signal transmitted via radio from a base station, which controls the radio area where the mobile terminal is currently located. Then, the mobile terminal demodulates the received control signal to detect the information regarding the latitude and longitude of the base station and then stores the information in the internal memory. Then, in the course of the progression of the game, the game is allowed to proceed in accordance with the value of the information regarding the latitude and longitude of the base station that has been stored in the internal memory, and the images in response to the contents of the progression of the game are displayed on a display screen. As such, scenario branches and the character images and item images to be displayed during the game may be allowed to differ in accordance with the information regarding the latitude and longitude of the base station.

According to the present invention, the contents of a game can be varied in accordance with the current location of a mobile terminal, that is, in accordance with the area where the user is playing the game with the mobile terminal.

The present disclosure relates to subject matter contained in priority Japanese Patent Application Nos. HEI 11-375189, filed on Dec. 28, 1999, and HEI 11-278899, filed on Sept. 30, 1999, the contents of which are herein expressly incorporated by reference in their entireties.

What is claimed is:

1. A mobile terminal which can receive radio signals transmitted by each of a plurality of base stations, comprising:
    a detector that detects a radiowave reception intensity of radio signals transmitted by the base stations,
    a progress system that allows a game to proceed according to the radiowave reception intensity detected by the detector during the game progress, and
    a display that displays images in response to the progression of the game.

2. The mobile terminal according to claim 1, further comprising:
    a branch information storage that stores a correspondence relationship between the signal intensity and scenario branch information for branching a scenario progression of a game, wherein
        the progress system branches the progress of the game in response to the scenario branch information stored in the branch information storage corresponding to the signal intensity determined by the detector.

3. The mobile terminal according to claim 1, further comprising a character storage that stores a correspondence relationship between the signal intensity and at least one game character, wherein
    the progress system determines a game character to be displayed from the at least one game character stored in the character storage corresponding to the signal intensity determined by the detector to vary the progression of the game.

4. The mobile terminal according to claim 1, further comprising an item storage that stores a correspondence relationship between the signal intensity and at least one item having an attribute for varying a game progression, wherein
    the progress system determines an item to be displayed from the at least one item stored in the item storage corresponding to the signal intensity determined by the detector to vary the progression of the game.

5. The mobile terminal according to claim 1, in which game progress occurs in response to operation input.

6. A method for controlling a game at a mobile terminal which can receive radio signals transmitted by each of a plurality of base stations, comprising:
    detecting radiowave reception intensity of radio signals transmitted by the base stations,
    progressing the game according to the radiowave reception intensity detected during the progression of the game, and
    displaying images in response to the progression of the game.

7. The method according to claim 6, further comprising:
    storing a correspondence relationship between the signal intensity and scenario branch information for branching a scenario progression of a game, wherein
        the progressing further comprises branching the progress of the game in response to the scenario branch information stored in the branch information storage corresponding to the signal intensity determined by the detecting.

8. The method according to claim 6, further comprising storing a correspondence relationship between the signal intensity and at least one game character, wherein
    the progressing further comprises determining a game character to be displayed from the at least one game character stored in the character storage corresponding to the signal intensity determined by the detecting to vary the progression of the game.

9. The method according to claim 6, further comprising storing a correspondence relationship between the signal intensity and at least one item having an attribute for varying a game progression, wherein
    the progressing further comprises determining an item to be displayed from the at least one item stored in the item storage corresponding to the signal intensity determined by the detecting to vary the progression of the game.

10. The method according to claim 6, in which game progress occurs in response to operation input.

11. A computer readable recording medium in which programs of a game to be executed on a mobile terminal which can receive radio signals transmitted from each of a plurality of base stations are stored, the computer readable recording medium storing the programs for allowing the computer to:
    detect radiowave reception intensity of radio signals transmitted by the base stations,
    progress the game according to the radiowave reception intensity detected during the progression of the game, progression of the game being carried out in response to operation input, and
    display images in response to the progression of the game.

12. The medium according to claim 11, further allowing the computer to:
    store a correspondence relationship between the signal intensity and scenario branch information for branching a scenario progression of a game, wherein
        the progressing further comprises branching the progress of the game in response to the scenario branch information stored in the branch information storage corresponding to the signal intensity determined by the detecting.

13. The medium according to claim 11, further allowing the computer to store a correspondence relationship between the signal intensity and at least one game character, wherein the progressing further comprises determining a game character to be displayed from the at least one game character stored in the character storage corresponding to the signal intensity determined by the detecting to vary the progression of the game.

14. The medium according to claim 11, further allowing the computer to store a correspondence relationship between the signal intensity and at least one item having an attribute for varying a game progression, wherein the progressing further comprises determining an item to be displayed from the at least one item stored in the item storage corresponding to the signal intensity determined by the detecting to vary the progression of the game.

15. The medium according to claim 11, in which game progress occurs in response to operation input.

* * * * *